US012650694B2

(12) United States Patent　　　　　(10) Patent No.:　US 12,650,694 B2
Hou et al.　　　　　　　　　　　　　(45) Date of Patent:　　Jun. 9, 2026

(54) MAP DRAWING METHOD AND DEVICE, MEDIUM AND ELECTRONIC APPARATUS

(71) Applicant: Beijing Roborock Innovation Technology Co., Ltd., Beijing (CN)

(72) Inventors: Zhengtao Hou, Beijing (CN); Yiming Cong, Beijing (CN); Jianbin Sun, Beijing (CN); Lizhi Xiang, Beijing (CN); Zhendong Jia, Beijing (CN)

(73) Assignee: BEIJING ROBOROCK INNOVATION TECHNOLOGY CO., LTD., Beijing (CN)

( * ) Notice: Subject to any disclaimer, the term of this patent is extended or adjusted under 35 U.S.C. 154(b) by 98 days.

(21) Appl. No.: 18/264,659

(22) PCT Filed: Feb. 9, 2022

(86) PCT No.: PCT/CN2022/075729
§ 371 (c)(1),
(2) Date: Aug. 8, 2023

(87) PCT Pub. No.: WO2022/171145
PCT Pub. Date: Aug. 18, 2022

(65) Prior Publication Data
US 2024/0302180 A1　　Sep. 12, 2024

(30) Foreign Application Priority Data

Feb. 10, 2021　(CN) .......................... 202110184745.8
Feb. 10, 2021　(CN) .......................... 202110184843.1

(51) Int. Cl.
*G05D 1/224*　　　　(2024.01)
*A47L 11/24*　　　　(2006.01)
(Continued)

(52) U.S. Cl.
CPC ............ *G05D 1/2246* (2024.01); *A47L 11/24* (2013.01); *A47L 11/4011* (2013.01);
(Continued)

(58) Field of Classification Search
CPC ............ G05D 1/2246; G05D 2107/40; G05D 2105/70; G05D 2105/10; G05D 2109/10;
(Continued)

(56) References Cited

U.S. PATENT DOCUMENTS 10,653,057 B2 *　5/2020　Choi ..................... G05D 1/0274
10,716,445 B2 *　7/2020　Chang .................. G05D 1/0274
(Continued)

FOREIGN PATENT DOCUMENTS

CN　　104897160 A　　9/2015
CN　　105446350 A　　3/2016
(Continued)

OTHER PUBLICATIONS

First Office Action for CN Patent Application No. 202110184843.1 of Jun. 6, 2022.
(Continued)

*Primary Examiner* — Manglesh M Patel
(74) *Attorney, Agent, or Firm* — Perilla Knox & Hildebrandt LLP; Kenneth A. Knox

(57)　　　　　　　ABSTRACT

Provided are a map drawing method, a map drawing device, a computer-readable storage medium and an electronic apparatus. The map drawing method comprises scanning a boundary of a surface medium region to generate an initialized region; merging boundary coordinates of the initialized region to obtain a merged region; dividing the merged region into a plurality of sub-regions according to a preset shape; and drawing the boundary of the surface medium region based on the sub-regions and the merged region to obtain a map of the surface medium region. The method can improve
(Continued)

the detailedness of the drawn map of the surface medium region.

14 Claims, 13 Drawing Sheets

(51) Int. Cl.

| | |
|---|---|
| *A47L 11/40* | (2006.01) |
| *G01C 21/00* | (2006.01) |
| *G05D 105/10* | (2024.01) |
| G05D 105/70 | (2024.01) |
| G05D 107/40 | (2024.01) |
| G05D 109/10 | (2024.01) |

(52) U.S. Cl.
CPC ........ *G01C 21/383* (2020.08); *A47L 2201/04* (2013.01); *G05D 2105/10* (2024.01); *G05D 2105/70* (2024.01); *G05D 2107/40* (2024.01); *G05D 2109/10* (2024.01)

(58) Field of Classification Search
CPC .... G01C 21/383; A47L 11/24; A47L 11/4011; A47L 2201/04; A47L 2201/06
USPC ........................................................ 701/2, 25
See application file for complete search history.

(56) References Cited

U.S. PATENT DOCUMENTS

| | | | | |
|---|---|---|---|---|
| 11,480,973 | B2 * | 10/2022 | Ackerman | ........... G05D 1/0221 |
| 2010/0211244 | A1 | 8/2010 | Jeong et al. | |
| 2012/0125363 | A1 | 5/2012 | Kim et al. | |
| 2018/0064024 | A1 | 3/2018 | Choi et al. | |
| 2019/0011923 | A1 * | 1/2019 | Xie | ..................... A47L 11/4011 |
| 2019/0025838 | A1 | 1/2019 | Artes et al. | |
| 2019/0061157 | A1 * | 2/2019 | Suvarna | ............... G05D 1/0274 |
| 2019/0176321 | A1 | 6/2019 | Afrouzi et al. | |
| 2019/0332114 | A1 | 10/2019 | Moroniti et al. | |
| 2020/0178748 | A1 * | 6/2020 | Han | ..................... G05D 1/0238 |
| 2021/0018927 | A1 | 1/2021 | Ackerman et al. | |
| 2022/0053144 | A1 * | 2/2022 | Penn | ....................... H04N 23/45 |
| 2022/0342426 | A1 * | 10/2022 | He | ....................... G05D 1/0274 |
| 2023/0393584 | A1 * | 12/2023 | Sun | ....................... G05D 1/0219 |
| 2024/0053762 | A1 * | 2/2024 | Wang | .................. A47L 11/4011 |
| 2024/0160227 | A1 * | 5/2024 | Huang | ................. G05D 1/0219 |

FOREIGN PATENT DOCUMENTS

| | | | |
|---|---|---|---|
| CN | 105796002 | A | 7/2016 |
| CN | 102314176 | B | 1/2017 |
| CN | 107480274 | A | 12/2017 |
| CN | 107766516 | A | 3/2018 |
| CN | 108106616 | A | 6/2018 |
| CN | 108230876 | A | 6/2018 |
| CN | 108470364 | A | 8/2018 |
| CN | 109085835 | A | 12/2018 |
| CN | 109934384 | A | 6/2019 |
| CN | 109934891 | A | 6/2019 |
| CN | 110200549 | A | 9/2019 |
| CN | 110704561 | A | 1/2020 |
| CN | 111166234 | A | 5/2020 |
| CN | 111166243 | A | 5/2020 |
| CN | 111168679 | A | 5/2020 |
| CN | 111522898 | A | 8/2020 |
| CN | 111750883 | A | 10/2020 |
| CN | 111767295 | A | 10/2020 |
| CN | 111857127 | A | 10/2020 |
| CN | 112035209 | A | 12/2020 |
| CN | 113693494 | A | 11/2021 |
| CN | 113706655 | A | 11/2021 |
| JP | 2003287424 | A | 10/2003 |
| KR | 1020180024325 | A | 3/2018 |
| WO | 2021010899 | A1 | 1/2021 |

OTHER PUBLICATIONS

International Search Report for International Patent Application No. PCT/CN2022/075729 of May 11, 2022.
International Search Report for International Patent Application No. PCT/CN2022/075551 of Apr. 19, 2022.
Extended European Search Report for EP Patent Application No. 22752305.7 of Dec. 13, 2024.
Non-final Office Action for U.S. Appl. No. 18/546,029 of Apr. 4, 2025.
Final Office Action for U.S. Appl. No. 18/546,029 of Oct. 7, 2025.
Non-final Office Action for U.S. Appl. No. 18/546,029 of Mar. 9, 2026.

* cited by examiner

152

155

154

156

153

155

154

152

154

156

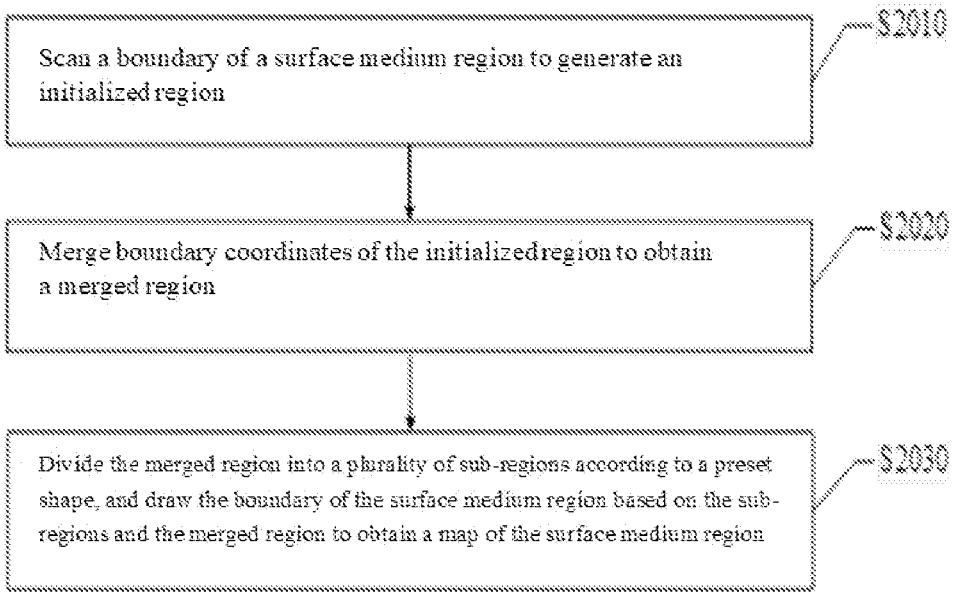

Scan a boundary of a surface medium region to generate an
initialized region — S2010

Merge boundary coordinates of the initialized region to obtain
a merged region — S2020

Divide the merged region into a plurality of sub-regions according to a preset
shape, and draw the boundary of the surface medium region based on the sub-
regions and the merged region to obtain a map of the surface medium region — S2030

Fig. 19

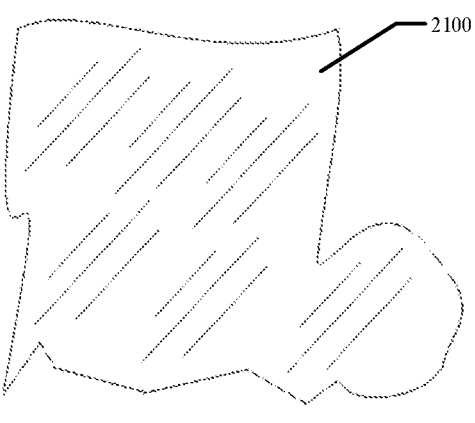
2100

Fig. 20

MAP DRAWING METHOD AND DEVICE, MEDIUM AND ELECTRONIC APPARATUS

CROSS-REFERENCE TO RELATED APPLICATIONS

The present application is a 35 U.S.C. 371 national phase application of International Application No. PCT/CN2022/075729 filed on Feb. 9, 2022, which claims the benefit of and priority to Chinese Patent Application No. 202110184843.1 filed on Feb. 10, 2021 and Chinese Patent Application No. 202110184745.8 filed on Feb. 10, 2021, which are incorporated herein by reference in their entireties.

TECHNICAL FIELD

The present disclosure relates to the field of smart homes and, more particularly, to a map drawing method, a map drawing device, a computer-readable storage medium, and an electronic apparatus.

BACKGROUND

In recent years, with the rapid development of computer technology and artificial intelligence, intelligent robot technology has gradually become a hotspot in the research field of modern robots. A ground sweeping robot, as the most practical type of intelligent robot, can automatically clean a ground by way of certain artificial intelligence.

At present, more and more families have laid carpets. In order to facilitate cleaning of the carpet, it is usually necessary to scan a boundary of the carpet to generate a carpet boundary image.

However, the carpet boundary image obtained by an existing technology is relatively rough, which is disadvantageous for a ground sweeping robot to clean based on this carpet boundary image.

SUMMARY

An object of the present disclosure is to provide a map drawing method, a map drawing device, a map display method, a map display device, a computer-readable storage medium, and an electronic apparatus, which can solve at least one of the above-mentioned technical problems.

According to a specific embodiment of the present disclosure, in a first aspect, the present disclosure provides a map drawing method. The map drawing method includes: scanning a boundary of a surface medium region to generate an initialized region; merging boundary coordinates of the initialized region to obtain a merged region; and dividing the merged region into a plurality of sub-regions according to a preset shape, and drawing the boundary of the surface medium region based on the sub-regions and the merged region to obtain a map of the surface medium region.

Optionally, the initialized region includes a plurality of initial boundary, coordinates; and the merged region includes a plurality of merged boundary coordinates.

Optionally, drawing the boundary of the surface medium region based on the sub-regions and the merged region includes: deleting the merged boundary coordinates outside the sub-regions and close to the sub-regions, and connecting the remaining merged boundary coordinates in sequence to draw the boundary of the surface medium region.

Optionally, after the boundary of the surface medium region is drawn, the method further includes: filling a surface medium mark within the boundary of the surface medium region to obtain the map of the surface medium region.

Optionally, merging the boundary coordinates of the initialized region to obtain the merged region includes: merging adjacent boundary coordinates in the initialized region to obtain the merged region.

Optionally, the method further includes: storing the map of the surface medium region in an automatic cleaning apparatus and sending the same to a user terminal through the automatic cleaning apparatus, after the map of the surface medium region is obtained.

Optionally, the preset shape is one of a square shape, a circular shape and a rhombic shape.

In a second aspect, the present disclosure provides a map drawing device. The map drawing device includes: a boundary scanning module configured to scan a boundary of a surface medium region to generate an initialized region; a region merging module configured to merge boundary coordinates of the initialized region to obtain a merged region; and a map drawing module configured to divide the merged region into a plurality of sub-regions according to a preset shape, and to draw the boundary of the surface medium region based on the sub-regions and the merged region to obtain a map of the surface medium region.

In a third aspect, the present disclosure provides a computer-readable storage medium having stored thereon a computer program. The computer program, when executed by a processor, implements the map drawing method described above.

In a fourth aspect, the present disclosure provides an electronic apparatus. The electronic apparatus includes a processor; and a memory configured to store processor-executable instructions, wherein the processor is configured to execute the map drawing method described above by executing the executable instructions.

In the map drawing method according to exemplary embodiment of the present disclosure compared with the prior art, the boundary of the surface medium region is scanned to generate the initialized region, the relatively smooth merged region may be obtained based on the initialized region, and then the boundary of the surface medium region may be drawn based on the sub-regions and the merged region, and thus the map of the surface medium region may be drawn. The obtained map of the surface medium region has a smooth boundary and thus the map of the surface medium region is more detailed, which is advantageous for the automatic cleaning apparatus to subsequently clean and position the surface medium region or edges thereof.

According to a specific embodiment of the present disclosure, in a fifth aspect, the present disclosure provides a map display method. The map display method includes: acquiring room map data and region map data; drawing a room map based on the room map data, and drawing a region map layer on the room map based on the region map data; and displaying the room map covered with the region map layer.

Optionally, drawing the region map layer on the room map based on the region map data includes: determining a positional relationship between the room map and the region map layer based on the room map data and the region map data; marking out a sub-region corresponding to the region map layer on the room map based on the positional relationship; and drawing the region map layer on the sub-region.

Optionally, drawing the region map layer on the sub-region includes: enlarging the sub-region by a preset ratio, and drawing units corresponding to the region map data on the enlarged sub-region to obtain the region map layer.

Optionally, the region map data includes region boundary coordinate data; and drawing the units corresponding to the region map data on the enlarged sub-region includes: drawing point units corresponding to the region map data on the enlarged sub-region one by one.

Optionally, the method further includes: restoring the size of the sub-region and covering the room map with the region map layer after the region map layer is obtained.

Optionally, the area of the sub-region is larger than the area of the region map layer, so that the region map layer may be drawn within the sub-region.

Optionally, the room map data includes room boundary coordinate data; and drawing the room map based on the room map data includes: determining a shape and size of a room map layer based on the room boundary coordinate data; and drawing the room boundary coordinate data on the room map layer one by one to obtain the room map.

In a sixth aspect, the present disclosure provides a map display device. The map display device includes: a data acquiring module configured to acquire room map data and region map data; a map drawing module configured to draw a room map based on the room map data, and to draw a region map layer on the room map based on the region map data; and a map display module configured to display the room map covered with the region map layer.

In a seventh aspect, the present disclosure provides a computer-readable storage medium having stored thereon a computer program. The computer program, when executed by a processor, implements the map display method described above.

In an eighth aspect, the present disclosure provides an electronic apparatus. The electronic apparatus includes a processor; and a memory configured to store processor-executable instructions, wherein the processor is configured to execute the map display method described above by executing the executable instructions.

Compared with the prior art, the map display method according to the exemplary embodiment of the present disclosure is applicable to a user equipment that interacts with an automatic cleaning apparatus. After the user equipment acquires the room map data and the region map data which are sent by the automatic cleaning apparatus, the region map layer may be drawn, based on the region map data, on the room map generated from the room map data, and thus the room map covered with the region map layer may be obtained, and the room map may be displayed through the user equipment. That is to say, while the room map is displayed on the user equipment, the region map layer is also displayed on the room map, thereby helping a user to more accurately position and control a region to be cleaned by the automatic cleaning apparatus.

BRIEF DESCRIPTION OF THE DRAWINGS

The accompanying drawings here are incorporated in the Description and constitute a part of the Description, show embodiments conforming to the present disclosure, and are used together with the Description to explain the principles of the present disclosure. Apparently, the accompanying drawings in the following description show only some embodiments of the present disclosure, and a person of ordinary skill in the art may still derive other drawings from these accompanying drawings without creative efforts. In the accompanying drawings:

FIG. 19 shows a flowchart of a map drawing method according to an embodiment of the present disclosure;

FIG. 20 shows a schematic structural diagram of an initialized region after a surface medium region is scanned according to an embodiment of the present disclosure:

DETAILED DESCRIPTION

To make the objects, technical solutions, and advantages of the present disclosure more apparent, the present disclosure will be further described in detail below with reference to the accompanying drawings. It is understood that the described embodiments are only part, but not all, of the embodiments of the present disclosure. All other embodiments obtained by those of ordinary skill in the art without creative efforts based on the embodiments in the present disclosure are within the protection scope of the present disclosure.

The terms used in the embodiments of the present disclosure are for the purpose of describing particular embodiments only and are not intended to limit the present disclosure. The singular forms "a/an", "said", and "the" used in the embodiments of the present disclosure and the appended claims are intended to include the plural forms as well, unless the context clearly indicates otherwise. The term "a plurality of" generally means at least two.

It should be understood that the term "and/or" used herein merely describes an association relationship of associated objects, and indicates that there may be three relationships. For example, A and/or B may indicate three cases: A exists separately, A and B exist at the same time, and B exists separately. In addition, the character "/" herein generally indicates an "or" relationship between the contextual objects.

It should be understood that although the terms first, second, third, etc. may be used to describe various components in the embodiments of the present disclosure, such components should not be limited to these terms. These terms are only used to distinguish one component from one another. For example, a first component may also be referred to as a second component without departing from the scope of the embodiments of the present disclosure. Similarly, the second component may also be referred to as a first component.

Depending on the context, the word "if" as used herein may be interpreted as "when" or "in response to determining" or "in response to detecting". Similarly, depending on the context, the phrases "if it is determined that" or "if it is detected that (the stated condition or event)" may be interpreted as "when it is determined that" or "in response to determining" or "when it is detected that (the stated condition or event)" or "in response to detecting (the stated condition or event)".

It should also be noted that the terms "includes," "contains," or any other variants thereof are intended to cover the nonexclusive containing, such that the commodities or devices including a series of elements not only include those elements, but also include other unclearly listed elements, or also include the inherent elements of such commodities or devices. Without more limitations, the element defined by the phrase "including a . . . " does not exclude the existence of other same elements in the commodity or device that including such element.

Figures 1, 2:
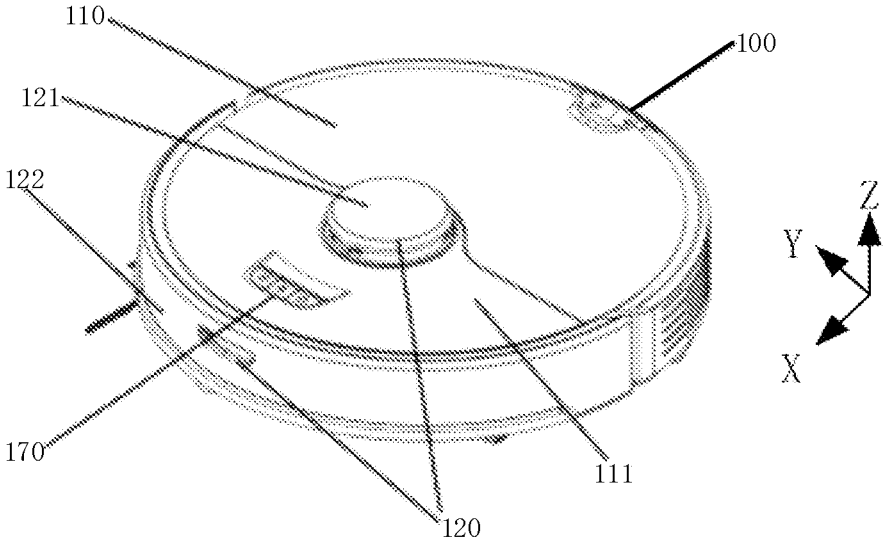
FIG. 1 is an oblique view of an automatic cleaning apparatus according to an embodiment of the present disclosure.
FIG. 2 is a schematic structural diagram of a bottom of an automatic cleaning apparatus according to an embodiment of the present disclosure.

FIG. 1 and FIG. 2 are schematic structural diagrams of an automatic cleaning apparatus according to an exemplary embodiment. As shown in FIGS. 1-2, the automatic cleaning apparatus may be a vacuum ground sucking robot, or may be a ground mopping/brushing robot, or may be a window climbing robot, etc. The automatic cleaning apparatus may include a mobile platform 100, a perception system 120, a control system 130, a driving system 140, a cleaning module 150, an energy system 160, and a human-computer interaction system 170.

The mobile platform 100 may be configured to move automatically on an operating surface in a target direction. The operating surface may be a surface to be cleaned by the automatic cleaning apparatus. In some embodiments, the automatic cleaning apparatus may be a ground mopping robot and, thus, the automatic cleaning apparatus operates on a ground, and the ground is the operating surface. The automatic cleaning apparatus may also be a window cleaning robot and, thus, the automatic cleaning apparatus operates on an outer surface of glass of a building, and the glass is the operating surface. The automatic cleaning apparatus may also be a pipe cleaning robot and, thus, the automatic cleaning apparatus operates on an inner surface of a pipe, and the inner surface of the pipe is the operating surface. For explanatory purposes only, the following description in this application takes a ground mopping robot as an example for illustration.

In some embodiments, the mobile platform 100 may be an autonomous mobile platform or a non-autonomous mobile platform. The autonomous mobile platform means that the mobile platform 100 itself can automatically and adaptively make an operational decision based on an unexpected environmental input. The non-autonomous mobile platform means that the mobile platform 100 itself cannot adaptively make an operational decision based on an unexpected environmental input, but can execute a given procedure or operate according to a certain logic. Correspondingly, when the mobile platform 100 is the autonomous mobile platform, the target direction may be determined autonomously by the automatic cleaning apparatus; and when the mobile platform 100 is the non-autonomous mobile platform, the target direction may be set systematically and manually. When the mobile platform 100 is the autonomous mobile platform, the mobile platform 100 includes a forward portion 111 and a rearward portion 110.

The perception system 120 includes a position determining device 121 located above the mobile platform 100, a buffer 122 located at the forward portion 111 of the mobile platform 100, a cliff sensor 123 located at a bottom of the mobile platform 100, and sensing devices, such as an ultrasonic sensor (not shown in the figures), an infrared sensor (not shown in the figures), a magnetometer (not shown in the figures), an accelerometer (not shown in the figures), a gyroscope (not shown in the figures), and an odometer (not shown in the figures), for providing various position information and motion state information of the automatic cleaning apparatus to the control system 130.

In order to more clearly describe behaviors of the automatic cleaning apparatus, the following directions are defined: the automatic cleaning apparatus may travel on the ground by various combinations of movements relative to the following three mutually perpendicular axes defined by the mobile platform 100: a transversal axis X, a front and rear axis Y and a center vertical axis Z. A forward driving direction along the front and rear axis Y is designated as "forward" and a rearward driving direction along the front and rear axis Y is designated as "rearward". The transversal axis X extends substantially between a right wheel and a left wheel of the automatic cleaning apparatus along an axis center defined by a center point of the driving wheel assembly 141. The automatic cleaning apparatus may rotate around the X axis. It is called "pitch up" when the forward portion of the automatic cleaning apparatus is tilted upward and the rearward portion thereof is tilted downward, and it is called "pitch down" when the forward portion of the automatic cleaning apparatus is tilted downward and the rearward portion thereof is tilted upward. In addition, the automatic cleaning apparatus may rotate about the Z axis. In a forward direction of the automatic cleaning apparatus, it is called "turn right" when the automatic cleaning apparatus is tilted to the right of the Y axis, and it is called "turn left" when the automatic cleaning apparatus is tilted to the left of the Y axis.

As shown in FIG. 2, cliff sensors 123 are provided at the bottom of the mobile platform 100 and in front and rear of the driving wheel assembly 141, respectively, for preventing the automatic cleaning apparatus from falling off when the automatic cleaning apparatus retreats, so as to avoid damage to the automatic cleaning apparatus. The aforementioned "front" refers to the side same as a traveling direction of the automatic cleaning apparatus, and the aforementioned "rear" refers to the side opposite to the traveling direction of the automatic cleaning apparatus.

The position determining device 121 includes, but is not limited to, a camera and a laser distance sensor (LDS).

The various components in the perception system 120 may operate independently or together to achieve a purpose function more accurately. The surface to be cleaned is identified through the cliff sensor 123 and the ultrasonic sensor to determine physical properties of the surface to be cleaned, including a surface medium degree of cleanliness, etc., which may be more accurately determined in combination with the camera and the laser distance sensor, etc.

For example, the ultrasonic sensor may determine whether the surface to be cleaned is a carpet. If the ultrasonic sensor determines that the surface to be cleaned is made of a carpet material, the control system 130 controls the automatic cleaning apparatus to perform a carpet mode cleaning.

The forward portion 111 of the mobile platform 100 is provided with the buffer 122. During cleaning, when the driving wheel assembly 141 propels the automatic cleaning apparatus to travel on the ground, the buffer 122 detects one or more events (or objects) in a traveling path of the automatic cleaning apparatus via a sensor system such as an infrared sensor, and the automatic cleaning apparatus may control the driving wheel assembly 141 based on the events (or objects) detected by the buffer 122, such as obstacles and wall surfaces, so as to cause the automatic cleaning apparatus to respond to the events (or objects), such as moving away from the obstacles.

The control system 130 is disposed on a main circuit board inside the mobile platform 100, and includes a computing processor, such as a central processing unit and an application processor, that communicate with a non-transitory memory such as a hard disk, a flash memory, and a random access memory. The application processor is configured to receive environmental information sensed by a plurality of sensors and transmitted from the perception system 120; draw a simultaneous map of an environment where the automatic cleaning apparatus is located based on obstacle information fed back by the laser distance sensor by use of a positioning algorithm, such as SLAM; autonomously determine a travelling path based on the environmental information and the environmental map; and then control the driving system 140 to perform operations such as travelling forward, travelling backward, and/or steering based on the autonomously determined travelling path. Further, the control system 130 may also determine whether to activate the cleaning module 150 to perform a cleaning operation based on the environmental information and the environmental map.

Specifically, the control system 130 may, based on distance information and speed information which are fed back by the buffer 122, the cliff sensor 123 and sensing devices such as the ultrasonic sensor, the infrared sensor, the magnetometer, the accelerometer, the gyroscope, and the odometer, comprehensively determine a current operating state of the ground sweeping robot, such as crossing a doorsill, getting on a carpet, locating at the edge of a cliff, being stuck from above or below, having a full dust box, being picked up, etc., and will also give a specific next action strategy for different situations, so that the work of the automatic cleaning apparatus meets the owner's requirements and provides better user experience. Further, the control system may plan the most efficient and reasonable cleaning path and cleaning mode based on the simultaneous map drawn by SLAM, which greatly improves the cleaning efficiency of the automatic cleaning apparatus.

Figure 3:
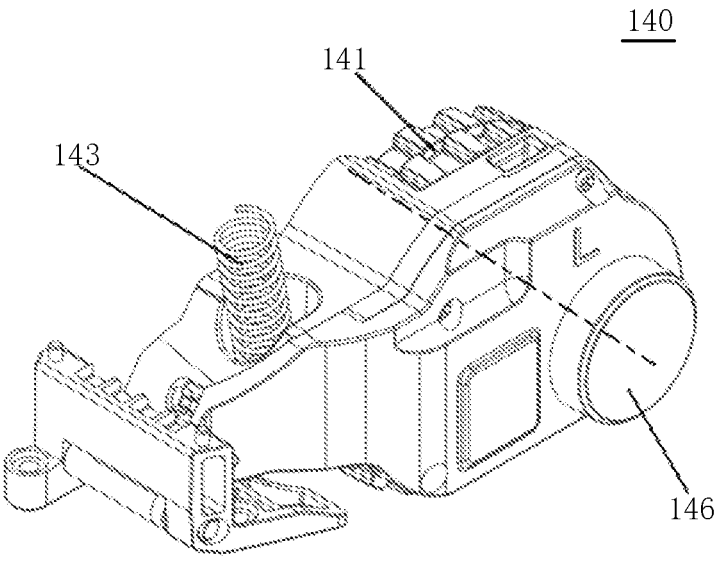
FIG. 3 is an oblique view of a driving wheel assembly on one side according to an embodiment of the present disclosure.
Figure 4:
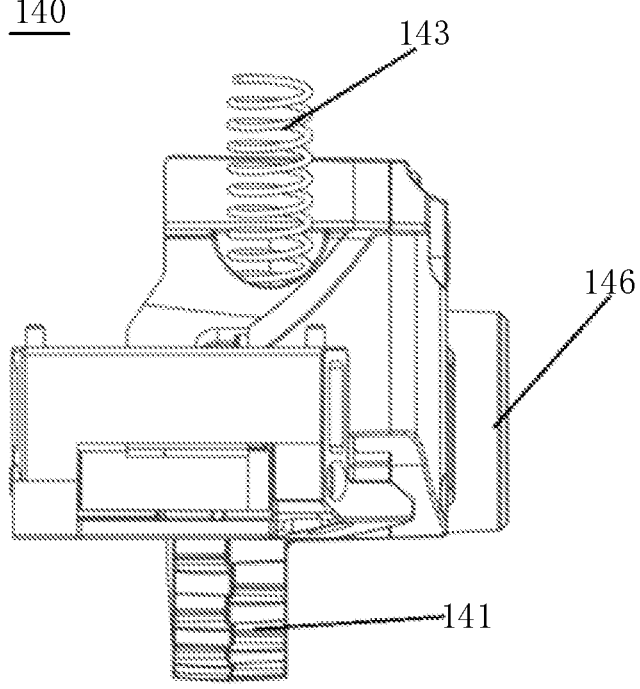
FIG. 4 is a front view of a driving wheel assembly on one side according to an embodiment of the present disclosure.

The driving system 140 may execute a driving command based on specific distance and angular information such as x, y, and theta components, so as to manipulate the automatic cleaning apparatus to travel across the ground. FIGS. 3 and 4 are an oblique view and a front view of a driving wheel assembly 141 on one side according to an embodiment of the present disclosure, respectively. As shown in the figures, the driving system 140 includes the driving wheel assembly 141, and the driving system 140 may control a left wheel and a right wheel simultaneously. In order to more precisely control the motion of the automatic cleaning apparatus, the driving system 140 optionally includes a left driving wheel assembly and a right driving wheel assembly, respectively. The left driving wheel assembly and the right driving wheel assembly are arranged symmetrically along the transverse axis defined by the mobile platform 100. The driving wheel assembly includes a housing and a connecting frame, and a driving motor 146 is disposed in the driving wheel assembly. The driving motor 146 is located outside the driving wheel assembly 141, and an axis center of the driving motor 146 is located within a cross-sectional projection of the driving wheel assembly, and the driving wheel assembly 141 may also be connected to a circuit for measuring a driving current and an odometer.

In order for the automatic cleaning apparatus to move on the ground more stably or have a higher movement ability, the automatic cleaning apparatus may include one or more steering assemblies 142, and the steering assembly 142 may be a driven wheel or a driving wheel, and structurally includes but is not limited to a universal wheel. The steering assembly 142 may be located in front of the driving wheel assembly 141.

The driving motor 146 provides power for rotation of the driving wheel assembly 141 and/or the steering assembly 142.

The driving wheel assembly 141 may be detachably connected to the mobile platform 100 to facilitate disassembly, assembly, and maintenance. The driving wheel may have an offset drop suspension system which is movably fastened, e.g., rotatably attached, to the mobile platform 100 of the automatic cleaning apparatus, and maintains contact and traction with the ground at a certain grounding force by an elastic element 143 such as a tension spring or a compression spring and, meanwhile, the cleaning module 150 of the automatic cleaning apparatus is also in contact with the surface to be cleaned at a certain pressure.

The energy system 160 includes a rechargeable battery, such as a nickel-hydride battery and a lithium battery. The rechargeable battery may be connected with a charging control circuit, a battery pack charging temperature detecting circuit and a battery undervoltage monitoring circuit; and the charging control circuit, the battery pack charging temperature detecting circuit and the battery undervoltage monitoring circuit are then connected to a single-chip microcomputer control circuit. A host of the automatic cleaning apparatus is connected to a charging pile through a charging electrode disposed on a side of or below a body of the automatic cleaning apparatus for charging.

The human-computer interaction system 170 includes buttons on a panel of the host of the automatic cleaning apparatus, and the buttons are used by a user to select functions. The human-computer interaction system 170 may also include a display screen and/or an indicator light and/or a horn. The display screen, the indicator light, and the horn present a current state or function items of the automatic cleaning apparatus to the user. The human-computer interaction system 170 may also include a mobile client program. For a route navigation type cleaning apparatus, the mobile client may present a map of the environment where the apparatus is located, as well as a location of the apparatus to the user, which may provide the user with a richer and more user-friendly experience.

The cleaning module 150 may include a dry cleaning module 151 and/or a wet cleaning module 400.

As shown in FIGS. 5-8, the dry cleaning module 151 includes a rolling brush, a dust box, a blower, and an air outlet. The rolling brush having a certain interference with the ground sweeps up garbage on the ground, and rolls up the garbage to the front of a dust sucking port between the rolling brush and the dust box. Then, the garbage is sucked into the dust box by air which has a sucking force, that is generated by the blower and passes through the dust box. The dust removal capacity of the ground sweeping robot may be characterized by the dust pickup efficiency (DPU) of the garbage. The DPU is affected by a structure and material of the rolling brush, the utilization rate of air in an air passage formed by the dust sucking port, the dust box, the blower, the air outlet and connecting components among the dust sucking port, the dust box, the blower, the air outlet, and a type and power of the blower, which is a complex system design problem. Compared with an ordinary plug-in vacuum cleaner, for an automatic cleaning apparatus with limited energy, the improvement of dust removal capacity is more meaningful. Because the improvement of the dust removal capacity directly and effectively reduces the demand for energy, that is to say, the original cleaning apparatus that may clean 80 square meters of ground on a single charge may be evolved to clean 180 square meters or more on a single charge. In addition, the service life of the battery having a reduced number of charging times will also be greatly increased, so that the frequency of replacing the battery by the user will be also reduced. What is more intuitive and important is that the improvement of the dust removal capacity is the most apparent and important user experience as the user will directly come to a conclusion about whether thorough cleaning is achieved. The dry cleaning module may also include a side brush 157 having a rotating shaft angled relative to the ground, for moving debris to a region of the rolling brush of the cleaning module 150.

Figure 5:
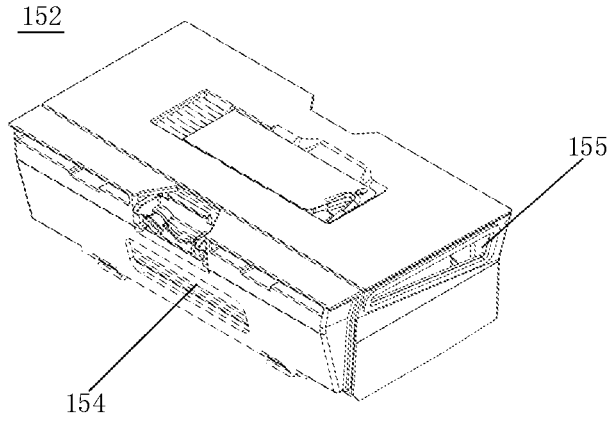
FIG. 5 is an oblique view of a dust box according to an embodiment of the present disclosure.
Figure 6:
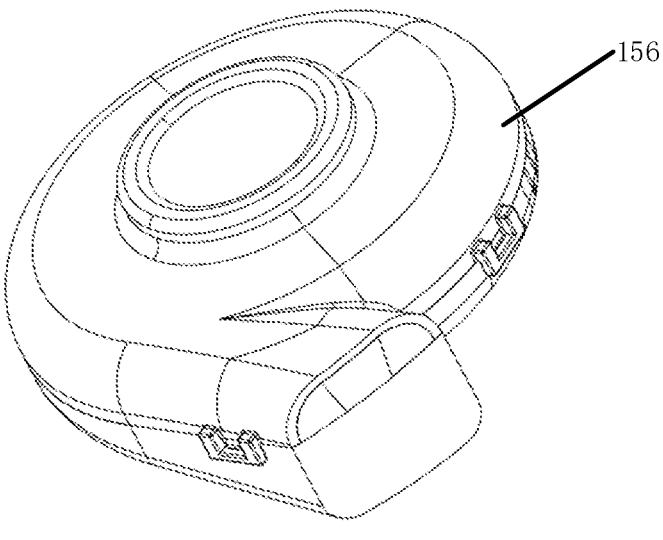
FIG. 6 is an oblique view of a blower according to an embodiment of the present disclosure.
Figure 7:
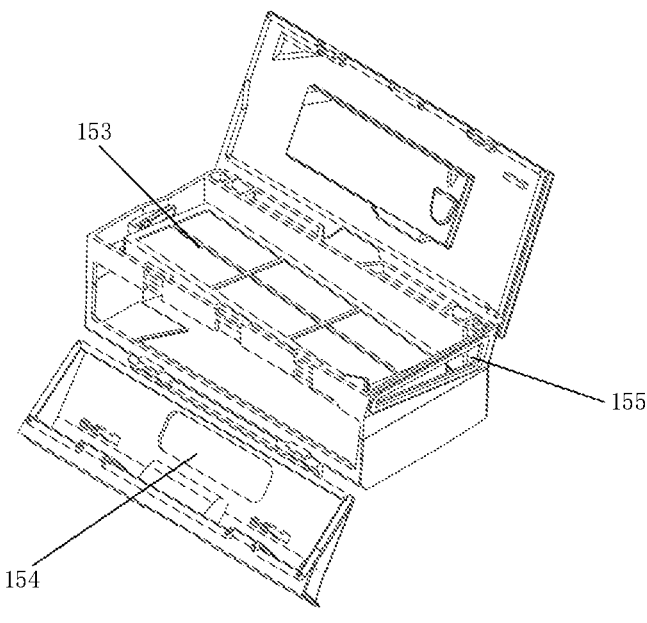
FIG. 7 is a schematic diagram of a dust box in an open state according to an embodiment of the present disclosure.
Figure 8:
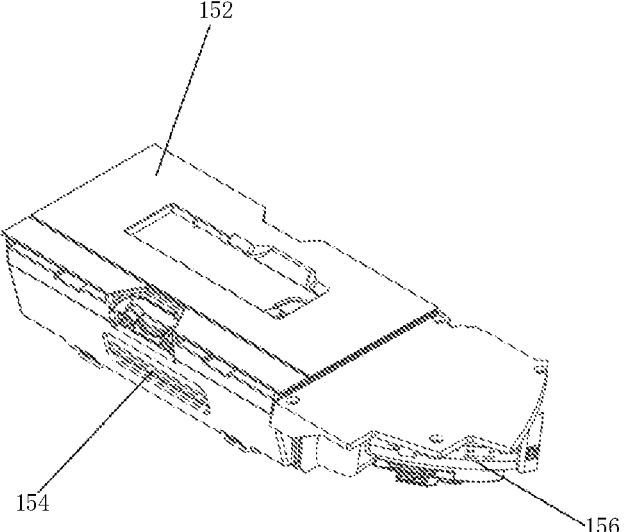
FIG. 8 is a schematic diagram of a dust box and a blower in an assembled state according to an embodiment of the present disclosure.

FIG. 5 is a schematic structural diagram of a dust box 152 in the dry cleaning module, FIG. 6 is a schematic structural diagram of a blower 156 in the dry cleaning module, FIG. 7 is a schematic diagram of the dust box 152 in an open state, and FIG. 8 is a schematic diagram of the dust box and the blower in an assembled state.

The rolling brush having a certain interference with the ground sweeps up garbage on the ground and rolls up the garbage to the front of the dust sucking port 154 between the rolling brush and the dust box 152. Then, the garbage is sucked into the dust box 152 by the air which has a sucking force, that is generated by the blower 156 and passes through the dust box 152. The garbage is isolated by a filtering mesh 153 on an inner side of the dust box 152 close to the dust sucking port 154. The filtering mesh 153 completely isolates the dust sucking port from the air outlet, and the filtered air enters the blower 156 through the air outlet 155.

Typically, the dust sucking port 154 of the dust box 152 is located in front of the automatic cleaning apparatus, the air outlet 155 is located on a side of the dust box 152, and an air sucking, port of the blower 156 is docked with the air outlet of the dust box.

A front panel of the dust box 152 may be opened for cleaning garbage within the dust box 152.

The filtering mesh 153 is detachably connected to a body of the dust box 152 to facilitate disassembly, assembly, and cleaning.

Figure 9:
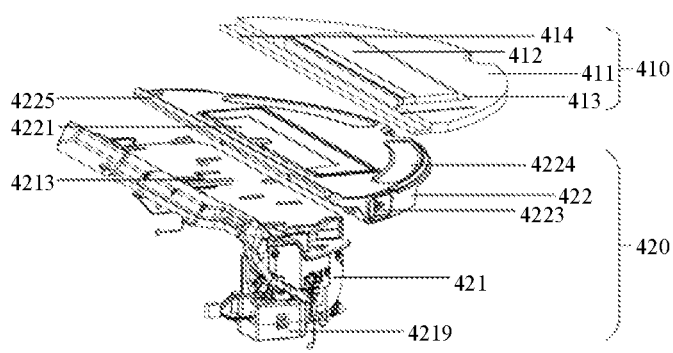
FIG. 9 is an exploded view of an automatic cleaning apparatus according to an embodiment of the present disclosure.
Figure 10:
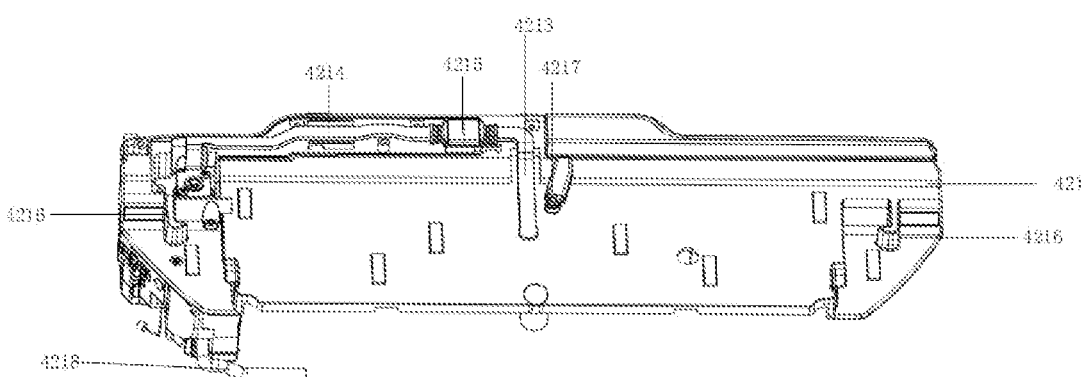
FIG. 10 is a structural diagram of a supporting platform of an automatic cleaning apparatus according to an embodiment of the present disclosure.
Figure 11:
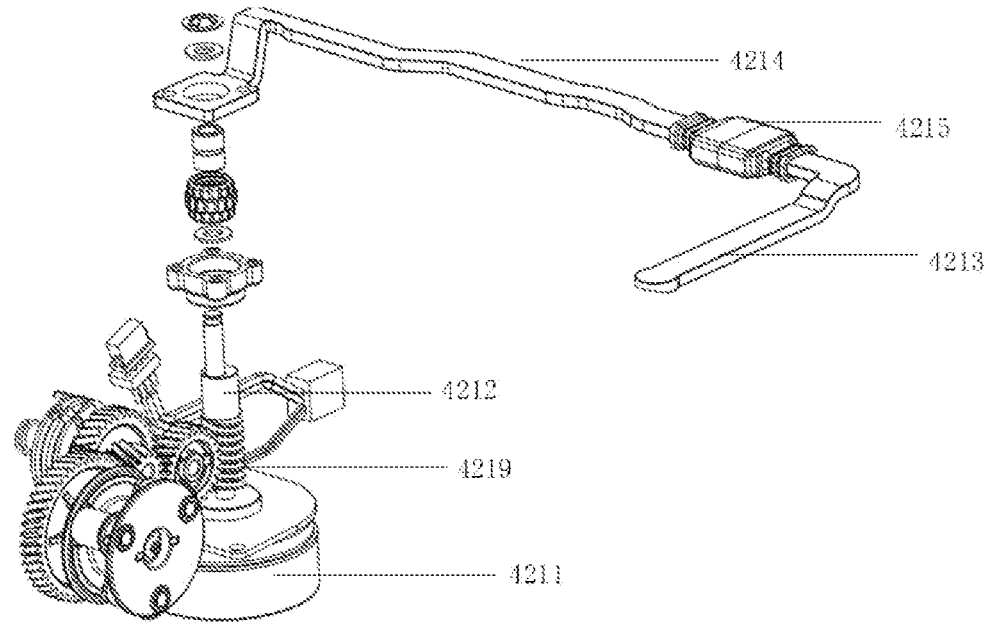
FIG. 11 is a structural diagram of a vibrating member of an automatic cleaning apparatus according to an embodiment of the present disclosure.

As shown in FIGS. 9-11, the wet cleaning module 400 according to the present disclosure is configured to clean at least a part of an operating surface by means of wet cleaning. The wet cleaning module 400 includes a cleaning head 410 and a driving unit 420. The cleaning head 410 is used for cleaning at least a part of the operating surface, and the driving unit 420 is used for driving the cleaning head 410 to reciprocate along a target surface, the target surface being a part of the operating surface. The cleaning head 410 reciprocates along a surface to be cleaned, and a surface of the cleaning head 410 in contact with the surface to be cleaned is provided with a cleaning cloth or a cleaning plate, which generates a high-frequency friction with the surface to be cleaned through a reciprocating motion thereof, thereby removing stains on the surface to be cleaned. The reciprocating motion may be a repeated motion along any one or more directions within the operating surface, or may be a vibrating motion perpendicular to the operating surface, which is not strictly limited.

As shown in FIG. 9, the driving unit 420 includes a driving platform 421 connected to a bottom surface of the mobile platform 100 for providing a driving force, and a supporting platform 422 detachably connected to the driving platform 421 for supporting the cleaning head 410 and being able to lift and lower under the driving of the driving platform 421.

A lifting and lowering module is provided between the cleaning module 150 and the mobile platform 100, so that the cleaning module 150 may better contact the surface to be cleaned, or different cleaning strategies are used for surfaces to be cleaned made of different materials.

The dry cleaning module 151 may be connected to the mobile platform 100 by a passive lifting and lowering module. When the cleaning apparatus encounters an obstacle, the dry cleaning module 151 may more easily pass the obstacle by the lifting and lowering module.

The wet cleaning module 400 may be connected to the mobile platform 100 by an active lifting and lowering module. When the wet cleaning module 400 does not participate in the work temporarily, or when encountering a surface to be cleaned which cannot cleaned by the wet cleaning module 400, the wet cleaning module 400 is lifted by the active lifting and lowering module and separated from the surface to be cleaned, and thus cleaning means may be changed.

As shown in FIGS. 10-11, the driving platform 421 includes: a motor 4211 disposed on a side of the driving platform 421 close to the mobile platform 100 and outputting power by a motor output shaft: a driving wheel 4212 connected to the motor output shaft and having an asymmetric structure; and a vibrating member 4213 which is disposed on a side of the driving platform 421 opposite to the motor 4211 and connected to the driving wheel 4212 and reciprocates under the asymmetrical rotation of the driving wheel 4212.

The driving platform 421 may further include a driving wheel and a gear mechanism. The gear mechanism 235 may connect the motor 4211 and the driving wheel 4212. The motor 4211 may directly drive the driving wheel 4212 to swivel, or may indirectly drive the driving wheel 4212 to swivel through the gear mechanism. Those skilled in the art can understand that the gear mechanism may be one gear, or may be a gear set composed of a plurality of gears.

The motor 4211 simultaneously transmits, by a power transmission device, power to the cleaning head 410, the driving platform 421, the supporting platform 422, a water delivery mechanism, a water tank, and the like. The energy system 160 provides power and energy for the motor 4211 and is entirely controlled by the control system 130. The power transmission device may be a gear drive, a chain drive, a belt drive, or may be a worm gear or the like.

The motor 4211 has a forward output mode and a reverse output mode. In the forward output mode, the motor 4211 rotates forward, and in the reverse output mode, the motor 4211 rotates reversely. In the forward output mode of the motor 4211, the motor 4211 may simultaneously drive, by the power transmission device, the cleaning head 410 in the wet cleaning module 400 and the water delivery mechanism to synchronously move.

Further, the driving platform 421 further includes a connecting rod 4214 extending along an edge of the driving platform 421 and connecting the driving wheel 4212 and the vibrating member 4213 so that the vibrating member 4213 extends to a preset position. An extending direction of the vibrating member 4213 is perpendicular to the connecting rod 4214.

The motor 4211 is connected to the driving wheel 4212, the vibrating member 4213, the connecting rod 4214 and a vibration buffering device 4215 through the power transmission device. When the wet cleaning module 400 is activated, the motor 4211 starts to rotate forward, the motor 4211 drives, through the driving wheel 4212, the connecting rod 4214 to reciprocate along a surface of the driving platform 421, and at the same time, the vibration buffering device 4215 drives the vibrating member 4213 to reciprocate along the surface of the driving platform 421, the vibrating member 4213 drives a cleaning substrate 4221 to reciprocate along a surface of the supporting platform 422, and the cleaning substrate 4221 drives a movable region 412 to reciprocate along the surface to be cleaned. At this point, a clean water pump makes clean water flow out from a clean water tank, and the clean water is sprinkled on the cleaning head 410 through a water discharging device 4217, and the cleaning head 410 reciprocates to clean the surface to be cleaned.

The cleaning intensity/efficiency of the automatic cleaning apparatus may also be automatically and dynamically adjusted according to an operating environment of the automatic cleaning apparatus. For example, the automatic cleaning apparatus may achieve dynamical adjustment according to physical information of the surface to be cleaned detected by the perception system 120. For example, the perception system 120 may detect the flatness of the surface to be cleaned, a material of the surface to be cleaned, whether there is oil and dust, and other information and transmit the information to the control system 130 of the automatic cleaning apparatus. Correspondingly, the control system 130 may instruct the automatic cleaning apparatus to automatically and dynamically adjust a rotational speed of the motor and a transmission ratio of the power transmission device according to the operating environment of the automatic cleaning apparatus, and thus to adjust a preset reciprocating cycle of the reciprocating motion of the cleaning head 410.

For example, when the automatic cleaning apparatus operates on a flat ground, the preset reciprocating period may be automatically and dynamically adjusted to be longer, and a water volume of the water pump may be automatically and dynamically adjusted to be smaller; and when the automatic cleaning apparatus operates on a less flat ground, the preset reciprocating period may be automatically and dynamically adjusted to be shorter, and the water volume of the pump may be automatically and dynamically adjusted to be larger. This is because it is easier to clean the flat ground than the less flat ground, and thus the reciprocating motion of the cleaning head 410 at a higher speed (i.e., higher frequency) and a larger water volume are needed for cleaning an uneven ground.

For another example, when the automatic cleaning apparatus operates on a table, the preset reciprocating period may be automatically and dynamically adjusted to be longer, and the water volume of the water pump may be automatically and dynamically adjusted to be smaller; and when the automatic cleaning apparatus 100 operates on a ground, the preset reciprocating period may be automatically and dynamically adjusted to be shorter, and the water volume of the water pump may be automatically and dynamically adjusted to be larger. This is because the table has less dust and oil compared to the ground, and the material of which the table is made easier to clean, and thus only a fewer number of reciprocating motions of the cleaning head 410 and a relatively smaller water volume of the water pump are needed for cleaning the table.

The supporting platform 422 includes the cleaning substrate 4221 disposed movably on the supporting platform 422. The cleaning substrate 4221 reciprocates under the vibration of the vibrating member 4213. Optionally, the cleaning substrate 4221 includes: an assembling notch (not shown) disposed at a position in contact with the vibrating member 4213. When the supporting platform 422 is connected to the driving platform 421, the vibrating member 4213 is assembled to the assembling notch, so that the cleaning substrate 4221 may reciprocate synchronously with the vibrating member 4213.

Figure 12:
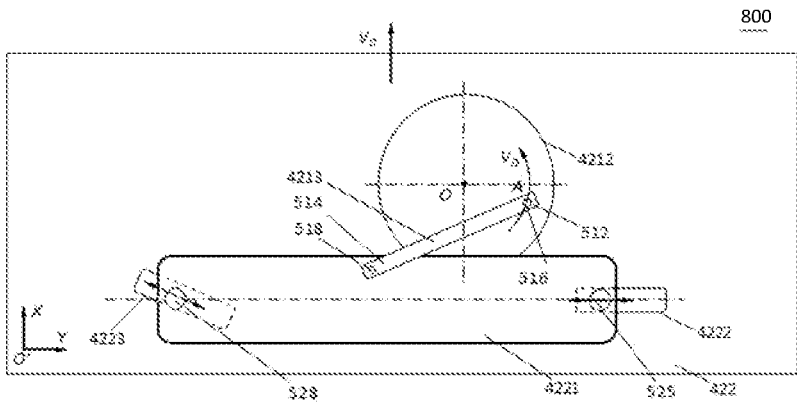
FIG. 12 is a schematic diagram of a cleaning head driving mechanism based on a crank slider mechanism according to another embodiment of the present disclosure.

FIG. 12 shows another cleaning head driving mechanism 800 based on a crank slider mechanism according to various embodiments of the present application. The driving mechanism 800 may be applied to the driving platform 421. The driving mechanism 800 includes a driving wheel 4212, a vibrating member 4213, a cleaning substrate 4221, a sliding slot 4222 (a first sliding slot) and a sliding slot 4223 (a second sliding slot).

The sliding slots 4222 and 4223 are formed in the supporting platform 422. Both ends of the cleaning substrate 4221 include a slider 525 (a first slider) and a slider 528 (a second slider), respectively. Each of the sliders 525 and 528 is a protrusion at each of both ends of the cleaning substrate 4221. The slider 525 is inserted within the sliding slot 4222 and may slide along the sliding slot 4222; and the slider 528 is inserted within the sliding slot 4223 and may slide along the sliding slot 4223. In some embodiments, the sliding slot 4222 and the sliding slot 4223 are on the same line. In some embodiments, the sliding slot 4222 and the sliding slot 4223 are not on the same line. In some embodiments, the sliding slot 4222 and the sliding slot 4223 extend in the same direction. In some embodiments, an extending direction of the sliding slot 4222 and an extending direction of the sliding slot 4223 are the same as that of the cleaning substrate 4221. In some embodiments, the extending direction of the sliding slot 4222 and the extending direction of the sliding slots 4223 are different from that of the cleaning substrate 4221. In some embodiments, the extending direction of the sliding slot 4222 is different from the extending direction of the sliding slot 4223. For example, as shown in FIG. 12, the extending direction of the sliding slot 4222 is the same as that of the cleaning substrate 4221, and the extending direction of the sliding slot 4223 is angled relative to that of the sliding slot 4222.

The vibrating member 4213 includes a swiveling end 512 and a sliding end 514. The swiveling end 512 is connected to the driving wheel 4212 through a first pivot 516, and the sliding end 514 is connected to the cleaning substrate 4221 through a second pivot 518.

A swiveling center of the driving wheel 4212 is a point O, and a pivoting center of the first pivot 516 is a point A. The point O and the point A do not coincide, and the distance between the point O and the point A is a preset distance d.

When the driving wheel 4212 rotates, the point A also swivels along a circular path. Correspondingly, the swiveling end 512 follows the point A to swivel along a circular path; and the sliding end 514 drives the cleaning substrate 4221 to slide through the second pivot 518. Correspondingly, the slider 525 of the cleaning substrate 4221 reciprocates linearly along the sliding slot 4222; and the slider 528 of the cleaning substrate 4221 reciprocates linearly along the sliding slot 4223. In FIG. 4, a moving speed of the mobile platform 100 is V0, and a moving direction thereof is the target direction. According to some embodiments, when the sliding slot 4223 and the sliding slot 4222 are respectively approximately perpendicular to the direction of the moving direction of the mobile platform 100, an overall displacement of the cleaning substrate 4221 is substantially perpendicular to the target direction. According to some other embodiments, when any one of the sliding slot 4223 and the sliding slot 4222 forms an angle other than 90 degrees with the target direction, the overall displacement of the cleaning substrate 4221 includes both a component perpendicular to the target direction and a component parallel to the target direction.

Further, a vibration buffering device 4215 is included, which is disposed on the connecting rod 4214 for reducing vibration in a specific direction. In this embodiment, the vibration buffering device 4215 is used for reducing vibration in the direction of the moving component perpendicular to the target direction of the automatic cleaning apparatus.

Figure 13:
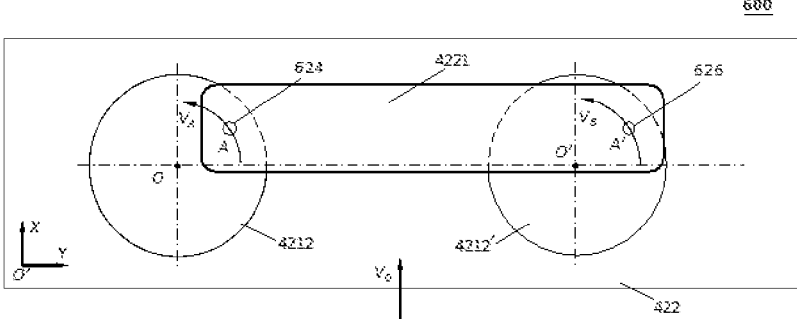
FIG. 13 is a schematic diagram of a cleaning head driving mechanism based on a double-crank mechanism according to another embodiment of the present disclosure.

FIG. 13 shows another cleaning head driving mechanism 600 based on a double-crank mechanism according to various embodiments of the present application. The driving mechanism 600 may be applied to the driving platform 421. The driving mechanism 600 includes a driving wheel 4212 (a first driving wheel), a driving wheel 4212' (a second driving wheel), and a cleaning substrate 4221.

The cleaning substrate 4221 has two ends, a first end thereof is connected to the driving wheel 4212 through a pivot 624 (a first pivot); and a second end thereof is connected to the driving wheel 4212' through a pivot 626 (a second pivot). A swiveling center of the driving wheel 4212 is a point O, and a pivoting center of the pivot 624 is a point A. The point O and the point A do not coincide, and the distance between the point O and the point A is a preset distance d. A swiveling center of the driving wheel 4212' is a point O', and a pivoting center of the pivot 626 is point A'. The point O' and the point A' do not coincide, and the distance between the point O' and the point A' is a preset distance d. In some embodiments, the point A, the point A', the point O, and the point O' are on the same plane. Therefore, the driving wheel 4212, the driving wheel 4212', and the cleaning substrate 4221 may form the double-crank mechanism (or a parallelogram mechanism), wherein the cleaning substrate 4221 acts as a coupling lever, and the driving wheels 4212 and 4212' act as two cranks.

Further, a vibration buffering device 4215 is included, which is disposed on the connecting rod 4214 for reducing vibration in a specific direction. In this embodiment, the vibration buffering device 4215 is used for reducing vibration in the direction of the moving component perpendicular to the target direction of the automatic cleaning apparatus.

Figure 14:
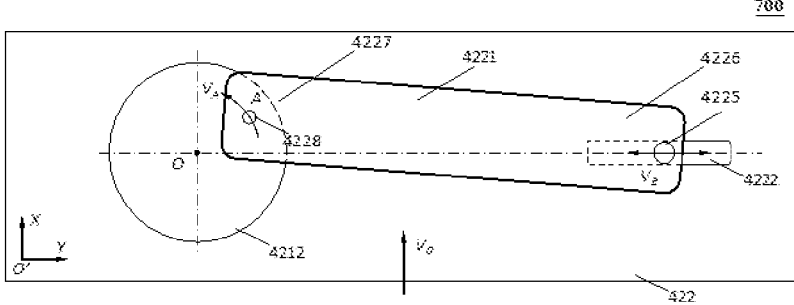
FIG. 14 is a schematic diagram of a cleaning head driving mechanism based on a crank mechanism according to another embodiment of the present disclosure.

FIG. 14 shows a driving mechanism 700 based on a crank slider mechanism according to various embodiments of the present application. The driving mechanism 700 may be applied to the driving platform 421. The driving mechanism 700 includes a driving wheel 4212, a cleaning substrate 4221 and a sliding slot 4222.

The sliding slot 4222 is formed in the supporting platform 422. The cleaning substrate 4221 includes a swiveling end 4227 and a sliding end 4226. The swiveling end 4227 is connected to the driving wheel 4212 through a pivot 4228. A swiveling center of the driving wheel 4212 is a point O, and a pivoting center of the pivot 4228 of the swiveling end is a point A. The point O and the point A do not coincide, and the distance between the point O and the point A is a preset distance d. The sliding end 4226 includes a slider 4225. The slider 4225 is a protrusion on the sliding end 4226. The slider 4225 is inserted within the sliding slot 4222 and may slide along the sliding slot 4222. Therefore, the driving wheel 4221, the cleaning substrate 4221, the slider 4225 and the sliding slot 4222 constitute the crank slider mechanism.

When the driving wheel 4212 rotates, the point A swivels along a circular path. Correspondingly, the swiveling end 4227 of the cleaning substrate 4221 follows the point A to swivel along a circular path; and the slider 4225 also slides in the sliding slot 4222 to reciprocate linearly. As a result, the cleaning substrate 4221 starts to reciprocate. According to some embodiments, the sliding slot 4222 is approximately perpendicular to the direction of the target direction of the mobile platform. Therefore, the linear motion of the sliding end 4226 includes a component perpendicular to the target direction, and the circular swiveling motion of the swiveling end 4227 includes both a component perpendicular to the target direction and a component parallel to the target direction.

In FIG. 14, the moving speed of the mobile platform is V0, a moving direction thereof is the target direction, and the sliding slot 4222 is approximately perpendicular to the target direction. At this point, the entire reciprocating motion of the cleaning substrate 4221 includes both a movement component parallel to the target direction of the automatic cleaning apparatus and a movement component perpendicular to the target direction of the automatic cleaning apparatus.

Further, a vibration buffering device 4215 is included, which is disposed on the connecting rod 4214 for reducing vibration in a specific direction. In this embodiment, the vibration buffering device 4215 is used for reducing vibration in the direction of the moving component perpendicular to the target direction of the automatic cleaning apparatus.

Further, the supporting platform 422 further includes an elastic detaching button 4229 disposed on at least one side of the supporting platform 422 for detachably connecting the supporting platform 422 to a pawl 4216 of the driving platform 421, and at least one assembling region 4224 disposed on the supporting platform 422 for assembling the cleaning head 410. The assembling region 4224 may be formed of an adhesive material with an adhesive layer.

As shown in FIG. 9, the cleaning head 410 includes a movable region 412 connected to the cleaning substrate 4221 and reciprocating along a surface to be cleaned under the driving of the cleaning substrate 4221. The movable region 412 is disposed at a substantially central position of the cleaning head 410. An adhesive layer is provided on a side of the movable region 412 which is connected to the cleaning substrate 4221, and the movable region 412 is connected to the cleaning substrate 4221 through the adhesive layer.

Optionally, the cleaning head 410 further includes a fixed region 411 connected to a bottom of the supporting platform 422 through the at least one assembling region 4224. The fixed region 411 cleans at least a part of the operating surface along with the movement of the supporting platform 422.

Further, the cleaning head 410 further includes a flexible connecting portion 413 disposed between the fixed region 411 and the movable region 412 for connecting the fixed region 411 and the movable region 412. The cleaning head 410 further includes a sliding buckle 414 extending along an edge of the cleaning head 410 and detachably mounted on at an engagement position of the supporting platform 422.

As shown in FIG. 9, the cleaning head 410 may be made of a material having a certain elasticity, and the cleaning head 410 is fixed on the surface of the supporting platform 422 through an adhesive layer so as to reciprocate. When operating, the cleaning head 410 is always in contact with the surface to be cleaned.

The water delivery mechanism includes the water discharging device 4217. The water discharging device 4217 may be directly or indirectly connected with a cleaning liquid outlet of a water tank (not shown), that is, a liquid discharging port of the clean water tank. A cleaning liquid may flow toward the water discharging device 4217 via the cleaning liquid outlet of the water tank, and may be evenly coated on the surface to be cleaned through the water discharging device. A connecting member (not shown in the figures) may be provided on the water discharging device, and the water discharging device is connected to the cleaning liquid outlet of the water tank through the connecting member. The water discharging device is provided with a distributing port. The distributing port may be a continuous opening, or a combination of several discontinuous small openings. Several nozzles may be provided at the distributing port. The cleaning liquid flows toward the distributing port via the cleaning liquid outlet of the water tank and the connecting member of the water discharging device, and is evenly coated on the operating surface via the distributing port.

The water delivery mechanism may further include a clean water pump 4219 and/or a clean water pump pipe 4218. The clean water pump 4219 may be communicated with the cleaning liquid outlet of the water tank directly or communicated with the cleaning liquid outlet of the water tank through the clean water pump pipe 4218.

The clean water pump 4219 may be connected to the connecting member of the water discharging device, and may be configured to pump the cleaning fluid from the water tank to the water discharging device. The clean water pump may be a gear pump, a vane pump, a plunger pump, a peristaltic pump, and the like.

The water delivery mechanism draws the cleaning liquid out of the clean water tank through the clean water pump 4219 and the clean water pump pipe 4218, and transports the cleaning liquid to the water discharging device. The water discharging device 4217 may be a sprinkler head, a drip hole, a wet cloth, and the like, and may spread water evenly on the cleaning head so as to wet the cleaning head and the surface to be cleaned. Stains on the wetted surface to be cleaned may be cleaned more easily. In the wet cleaning module 400, the power/flow rate of the clean water pump may be adjusted.

The driving unit and a vibrating region are added to the wet cleaning module, and thus the cleaning head may reciprocate so as to repeatedly clean the surface to be cleaned. Therefore, in the movement trajectory of the automatic cleaning apparatus, a region may be cleaned several times when the cleaning robot passes through the region just one time, thereby greatly enhancing the cleaning effect, especially for regions with more stains, the cleaning effect is readily apparent.

Figure 15:
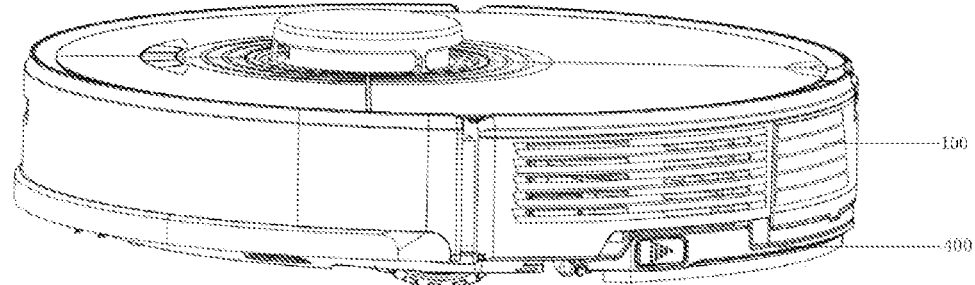
FIG. 15 is a schematic diagram of an automatic cleaning apparatus in a lifting state according to an embodiment of the present disclosure.
Figure 16:
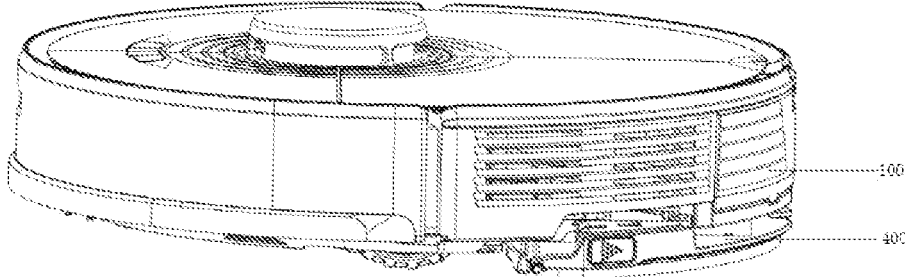
FIG. 16 is a schematic diagram of an automatic cleaning apparatus in a lowering state according to an embodiment of the present disclosure.

According to a specific embodiment of the present disclosure, the present disclosure provides a liftable automatic cleaning apparatus. The liftable automatic cleaning apparatus includes a mobile platform 100 configured to move automatically on an operating surface; and a wet cleaning module 400 movably connected to the mobile platform 100 through a four-link lifting and lowering structure 500 and configured to clean at least a part of the operating surface by means of wet cleaning. The four-link lifting and lowering structure 500 is a parallelogram structure and used to switch the wet cleaning module 400 between a lifting state and a lowering state. The lifting state is a state in which the wet cleaning module 400 leaves the operating surface, as shown in FIG. 15; and the lowering state is a state in which the wet cleaning module 400 is attached to the operating surface, as shown in FIG. 16.

Figure 17:
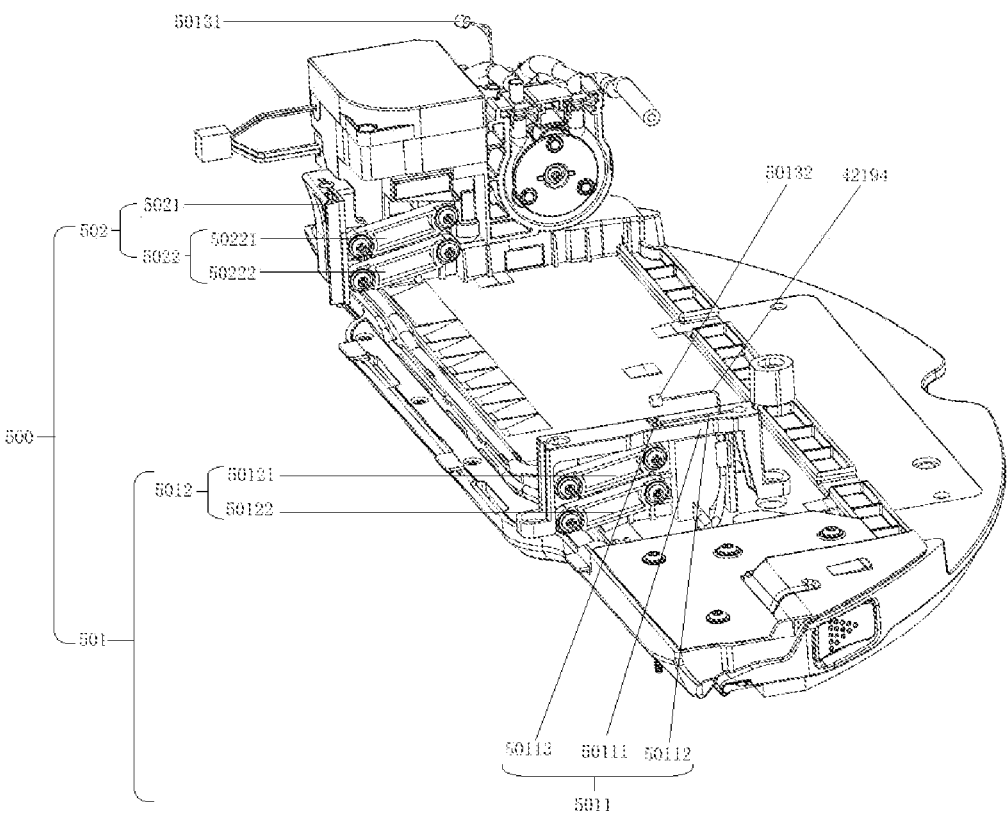
FIG. 17 is a schematic diagram of a four-link lifting and lowering structure in a lifting state according to an embodiment of the present disclosure.
Figure 18:
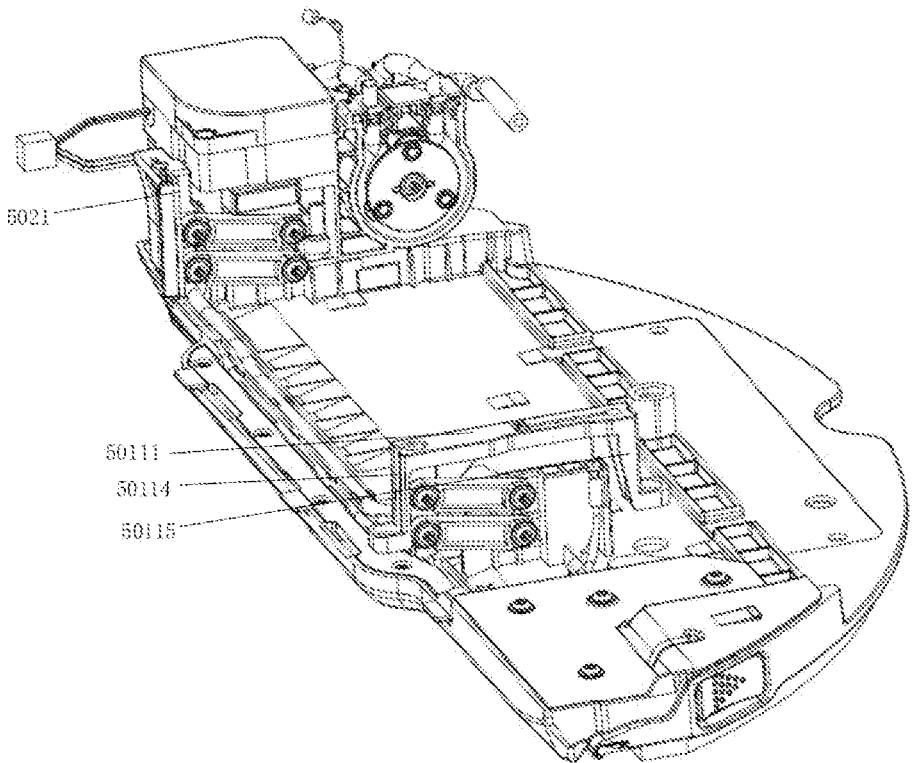
FIG. 18 is a schematic diagram of a four-link lifting and lowering structure in a lowering state according to an embodiment of the present disclosure.

As shown in FIGS. 17-18, the four-link lifting and lowering structure 500 includes: a first connecting end 501 for providing active power to switch the wet cleaning module 400 between the lifting state and the lowering state; and a second connecting end 502 disposed opposite to the first connecting end 501 and rotated under the action of the active power. The first connecting end 501 and the second connecting end 502 are located on two sides of the wet cleaning module 400, respectively, and the wet cleaning module 400 is lifted or lowered by stably providing a lifting force or a lowering force.

Specifically, the first connecting end 501 includes a first bracket 5011 fixedly connected to a bottom of the mobile platform 100. The first bracket 5011 is roughly shaped like a Chinese character "儿", and the first bracket 5011 includes: a cross beam 50111, a first longitudinal beam 50114 and a second longitudinal beam 50115. A tail end of each of the first longitudinal beam 50114 and the second longitudinal beam 50115 is respectively fixedly connected to the mobile platform 100 through a bolt, so as to provide a supporting force when the wet cleaning module 400 is lifted and lowered.

The first connecting end 501 further includes a first connecting rod pair 5012. One end of the first connecting rod pair 5012 is rotatably connected to the first bracket 5011, and the other end thereof is rotatably connected to the wet cleaning module 400. The first connecting rod pair 5012 may be of a hollowed-out structure, which can reduce overall weight of lifting ends and lowering ends.

Optionally, the first connecting rod pair 5012 includes a first connecting rod 50121 and a second connecting rod 50122 which are arranged in parallel. A first end of each of the first connecting rod 50121 and the second connecting rod 50122 is rotatably connected to the first longitudinal beam 50114 through a movable stud, and a second end of each of the first connecting rod 50121 and the second connecting rod 50122 is rotatably connected to the wet cleaning module 400 through a movable stud. For example, each of two ends of each of the first connecting rod 50121 and the second connecting rod 50122 is provided with a through hole having a diameter larger than that of the movable stud, so that the movable stud may rotate freely within the through hole, and the movable stud is fixedly connected to the first longitudinal beam 50114 through the through hole. When the motor 4211 provides a pulling force to the first end through a cable, the first ends of the first connecting rod 50121 and the second connecting rod 50122 simultaneously rotate around the movable studs at the first ends, and the second ends thereof are lifted under the pulling force of the cable, so that the wet cleaning module 400 is lifted. When the motor 4211 releases the pulling force to the first end through the cable, the first ends of the first connecting rod 50121 and the second connecting rod 50122 simultaneously reversely rotate around the movable studs at the first ends, and the second ends thereof are lowered under the action of gravity, so that the wet cleaning module 400 is lowered.

The lifting and lowering structure 500 further includes the cable 42194 for providing a pulling force to rotate the first connecting rod pair 5012 within a preset angle. The cable 42194 includes a cable motor terminal 50131 and a cable bracket terminal 50132. The cable motor terminal 50131 is connected to the driving unit 420, for example, is wound on and connected to the gear connected to the motor output shaft, and extends and contracts under the rotation of the motor; and the cable bracket terminal 50132 is connected to the first bracket 5011, and the motor lifts or lowers the second ends of the first connecting rod 50121 and the second connecting rod 50122 through the cable 42194.

Optionally, the first bracket 5011 further includes: a sliding slot 50112 extending along a surface of the cross beam 50111; and a snapping hole 50113 running through the cross beam 50111 and disposed at an extended end of the sliding slot 50112 for accommodating and snapping the cable bracket terminal 50132. The cable 42194 is connected to the first ends of the first connecting rod 50121 and the second connecting rod 50122 through the sliding slot 50112 and the snapping hole 50113. The sliding slot 50112 may restrict a movement direction of the cable, thereby ensuring the stability during the lifting and lowering of the module, and the width of the sliding slot should be matched with the thickness of the cable.

As shown in FIG. 17, the second connecting end 502 includes: a second bracket 5021 fixedly connected to a bottom of the mobile platform 100; and a second connecting rod pair 5022, one end of which is rotatably connected to the second bracket 5021, and the other end of which is rotatably connected to the wet cleaning module 400. The second connecting rod pair 5022 rotates with the rotation of the first connecting rod pair 5012. The second connecting rod pair 5022 may be of a hollowed-out structure, which can reduce overall weight of lifting ends and lowering ends.

Specifically, the second connecting rod pair 5022 includes a third connecting rod 50221 and a fourth connecting rod 50222 which are arranged in parallel. A first end of each of the third connecting rod 50221 and the fourth connecting rod 50222 is rotatably connected to the second bracket 5021 through a movable stud, and a second end of each of the third connecting rod 50221 and the fourth connecting rod 50222 is rotatably connected to the wet cleaning module 400 through a movable stud. For example, each of two ends of each of the third connecting rod 50221 and the fourth connecting rod 50222 is provided with a through hole having a diameter larger than that of the movable stud, so that the movable stud may rotate freely within the through hole, and the movable stud is fixedly connected to the second bracket 5021 and the wet cleaning module 400 through the through hole. When the first connecting end 501 rotates under the driving of the motor 4211, the first ends of the third connecting rod 50221 and the fourth connecting rod 50222 simultaneously rotates around the movable studs at the first ends, and the second ends of the third connecting rod 50221 and the fourth connecting rod 50222 simultaneously rotate around the movable studs at the second ends, so that the wet cleaning module 400 is lifted. When the pulling force to the first connecting end 501 is released, the first ends of the third connecting rod 50221 and the fourth connecting rod 50222 simultaneously reversely rotate around the movable studs at the first ends, and the second ends thereof are lowered under the action of gravity, so that the wet cleaning module 400 is lowered.

By means of the four-link lifting and lowering structure disposed between the wet cleaning module and the mobile platform, the wet cleaning module may be lifted and lowered relative to the mobile platform. When a mopping task is performed, the wet cleaning module is lowered, so that the wet cleaning module is in contact with the ground, and when the mopping task is completed, the wet cleaning module is lifted, so that the wet cleaning module is separated from the ground, thereby avoiding the increased resistance due to the existence of the cleaning module when the cleaning apparatus moves freely on the surface to be cleaned.

In cooperation with a surface medium sensor and other sensors that may detect a surface type of the surface to be cleaned, the lifting and lowering module enables the wet cleaning module to perform a cleaning operation according to different surfaces to be cleaned. For example, the lifting and lowering module lifts the wet cleaning module in case of a carpet surface, and lowers the wet cleaning module in case of a floor surface or a floor tile surface, for cleaning. Thus, a more comprehensive cleaning effect is achieved.

For an existing automatic cleaning apparatus without a surface medium sensor, a carpet medium is usually regarded as an obstacle, and the automatic cleaning apparatus avoids this obstacle upon cleaning a ground. However, for an automatic cleaning apparatus equipped with a surface medium sensor 103, a carpet region will be detected, and the carpet may even need to be cleaned. At this point, obtaining a detailed map of the carpet region is beneficial for the automatic cleaning apparatus to clean the carpet.

Based on this, an exemplary embodiment of the present disclosure provides a map drawing method. Referring to FIG. 19, the map drawing method may include: step S2010: scanning a boundary of a surface medium region to generate an initialized region; step S2020: merging boundary coordinates of the initialized region to obtain a merged region; and step S2030: dividing the merged region into a plurality of sub-regions according to a preset shape, and drawing the boundary of the surface medium region based on the sub-regions and the merged region to obtain a map of the surface medium region.

In the map drawing method according to the exemplary embodiment of the present disclosure, the boundary of the surface medium region is scanned to generate the initialized region, the relatively smooth merged region may be obtained based on the initialized region, and then the boundary of the surface medium region may be drawn based on the sub-regions and the merged region, and thus the map of the surface medium region may be drawn. The obtained map of the surface medium region has a smooth boundary, and thus the map of the surface medium region is more detailed, which is advantageous for an automatic cleaning apparatus to subsequently clean and position the surface medium region or edges thereof.

It should be noted that the above-mentioned map drawing method may be used not only for drawing a map of a single surface medium region, but also for drawing a map of a second surface medium region located in the first surface medium region. A first surface medium here is one or more of a wood floor, a carpet, a ceramic tile, a cement surface and other ground surface medium; and a second surface medium is one or more of a wood floor, a carpet, a ceramic tile, a cement surface and other ground surface medium, which is different from the first surface medium.

When the automatic cleaning apparatus cleans within the first surface medium region, for example, when the automatic cleaning apparatus cleans along a wall, the surface medium sensor 103 of the automatic cleaning apparatus records a position of the second surface medium region upon detecting the second surface medium region. Thereafter, the automatic cleaning apparatus will activate a surface medium region drawing module to draw a map of the second surface medium region for subsequent reference and invoking.

In the exemplary embodiment of the present disclosure, scanning the boundary of the surface medium region to draw the map of the surface medium region includes: scanning the boundary of the surface medium region to generate an initialized region.

In the exemplary embodiment of the present disclosure, a surface medium region identifying device (e.g., a surface medium sensor that may identify a surface medium) may be used to scan the boundary of the surface medium region. For example, a carpet identifying device is used to scan a boundary of a carpet region. After scanning, the initialized region 2100 as shown in FIG. 20 may be generated based on the scanned boundary, and the initialized region 2100 may also be recorded in the automatic cleaning apparatus.

Figure 21:
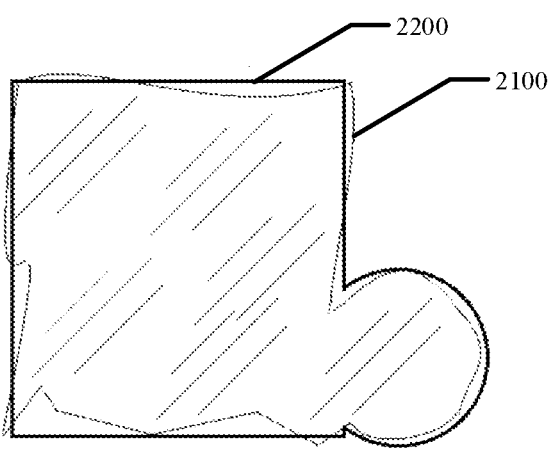
FIG. 21 shows a schematic structural diagram of a merged region obtained based on the initialized region shown in FIG. 20.

Next, boundary coordinates of the initialized region 2100 may be merged, for example, two or more adjacent boundary coordinates may be merged into one coordinate, and specifically, an average coordinate of two or more adjacent boundary coordinates may be taken as a boundary coordinate of the merged region, so as to obtain a merged region 2200 having a boundary smoother than a boundary of the initialized region 2100 as shown in FIG. 21. Meanwhile, the merged region 2200 may also be stored in the automatic cleaning apparatus for reference during subsequent cleaning.

Figure 22:
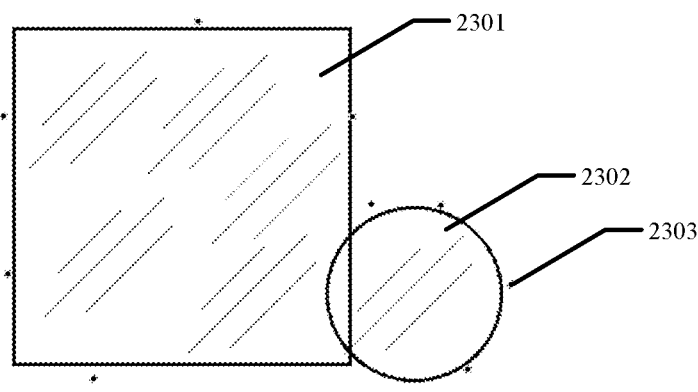
FIG. 22 shows a schematic structural diagram of sub-regions determined based on the merged region shown in FIG. 21.

In the exemplary embodiment of the present disclosure, after the merged region 2200 is obtained, as shown in FIG. 22, the merged region 2200 needs to be divided according to a preset shape to form a plurality of sub-regions 2301 and 2302, and the plurality of sub-regions 2301 and 2302 are stored in the automatic cleaning apparatus, and some of the sub-regions may be cleaned as needed during subsequent cleaning.

However, in the exemplary embodiment of the present disclosure, after the plurality of sub-regions are obtained, each of the sub-regions needs to be smoothed according to a preset shape, so as to obtain the map of the surface medium region with beautified edges.

In practical applications, during the process of scanning the boundary of the surface medium region by the automatic cleaning apparatus, the smallest unit that the automatic cleaning apparatus may identify is point coordinates, and these point coordinates will enclose the initialized region, that is, the initialized region is composed of a plurality of initial boundary coordinates. Likewise, the merged region is also composed of a plurality of merged boundary coordinates.

Figure 23:
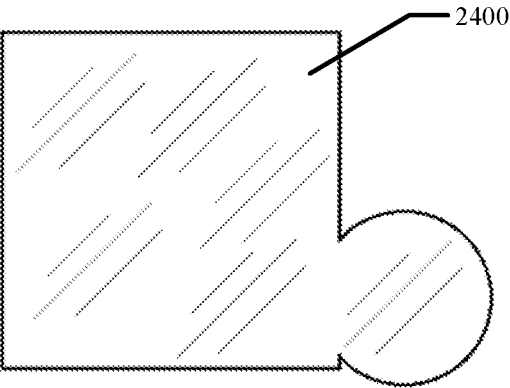
FIG. 23 shows a schematic structural diagram of a map of a surface medium region drawn by a map drawing method according to an embodiment of the present disclosure.

In the exemplary embodiment of the present disclosure, during the process of smoothing each of the sub-regions, the merged boundary coordinates outside the sub-region and close to the sub-region may be deleted, for example, a redundant merged boundary coordinate point 2303 in FIG. 22 may be deleted, and thus redundant coordinate data may be removed. Thus, the drawn map of the surface medium region is closer to a conventional shape such as the preset shape, thereby avoiding drawing an unconventional map such as a conical map with a sharp boundary, improving the accuracy of the drawn map of the surface medium region, and providing a more precise reference for subsequent cleaning of the automatic cleaning apparatus. FIG. 23 shows an example of a map 2400 of the surface medium region drawn by the map drawing method according to the exemplary embodiment of the present disclosure.

It should be noted that the merged boundary coordinates outside the sub-regions and close to the sub-regions here refer to the merged boundary coordinates located outside all of the sub-regions. Moreover, the merged boundary coordinates outside the sub-region and close to the sub-region may be determined based on the shortest distance from a boundary of the sub-region, for example, when a distance of a merged boundary coordinate from the boundary of the sub-region is the shortest distance, that is, when the distance of the merged boundary coordinate from the boundary of the sub-region closest to this merged boundary coordinate is less than a preset distance, this merged boundary coordinate is determined as the merged boundary coordinate outside the sub-region and close to the sub-region.

In practical applications, the size of the preset distance may be set according to the actual situation, for example, may be determined based on the size of the sub-region, which is not particularly limited in this exemplary embodiment.

In the exemplary embodiment of the present disclosure, after the merged boundary coordinates outside the sub-regions and close to the sub-regions are deleted, the remaining merged boundary coordinates may be sequentially connected with lines to draw a relatively smooth boundary of the surface medium region, so as to lay the foundation for obtaining the map of the surface medium region with beautified edges.

After the boundary of the surface medium region is drawn, it is needed to fill a surface medium mark within the boundary of the surface medium region to obtain the map of the surface medium region. The surface medium mark may be a color mark, that is, the boundary of the surface medium region is filled with a color different from the colors of other surface medium regions for distinguishing; or, the surface medium mark may be a mark that may be easily distinguished by other machines such as other automatic cleaning apparatuses, which is not particularly limited in the exemplary embodiment of the present disclosure.

In practical applications, the preset shape may be a square shape, a circular shape, a rhombic shape or other shapes. As shown in FIG. 22, the sub-region 2301 determined based on the preset shape is a square region, and the sub-region 2302 is a circular region. The specific preset shape is not particularly limited in the exemplary embodiment of the present disclosure.

After the map of the surface medium region is obtained, the surface medium region may also be stored in a memory of the automatic cleaning apparatus, and then the surface medium region together with a stored room map may be sent to a user terminal through the automatic cleaning apparatus, so that it is easy for a user to view the room map with the map of the surface medium region to facilitate the user's later control operations.

In practical applications, the automatic cleaning apparatus also includes other functions that help to realize the overall operation, which will not be repeated in this exemplary embodiment.

It should be noted that although the steps of the method of the present disclosure are described in a specific order in the drawings, this does not require or imply that these steps must be performed in this specific order, or that all of the steps shown must be performed in order to achieve the desired result. Additionally or alternatively, some steps may be omitted, multiple steps may be combined into one step for execution, and/or one step may be decomposed into multiple steps for execution, and the like.

Figure 24:
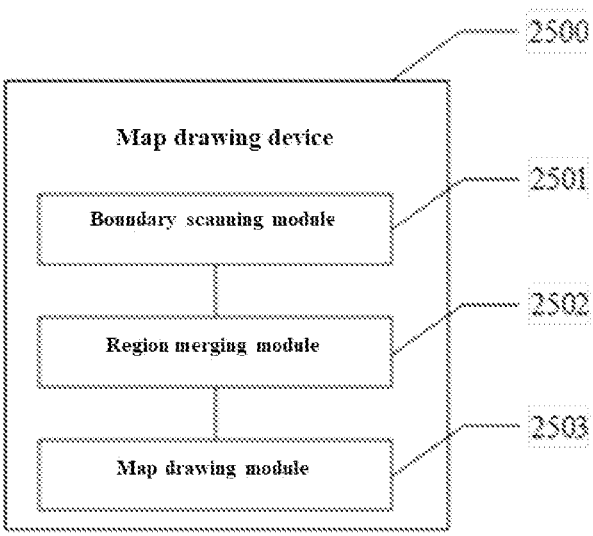
FIG. 24 shows a block diagram of a map drawing device according to an embodiment of the present disclosure.

In an exemplary embodiment of the present disclosure, there is further provided a map drawing device disposed in an automatic cleaning apparatus including a surface medium sensor. As shown in FIG. 24, the map drawing device 2500 may include: a boundary scanning module 2501, a region merging module 2502, and a map drawing module 2503.

The boundary scanning module 2501 is configured to scan a boundary of a surface medium region to generate an initialized region.

The region merging module 2502 is configured to merge boundary coordinates of the initialized region to obtain a merged region.

The map drawing module 2503 is configured to divide the merged region into a plurality of sub-regions according to a preset shape, and to draw the boundary of the surface medium region based on the sub-regions and the merged region to obtain a map of the surface medium region.

Figure 25:
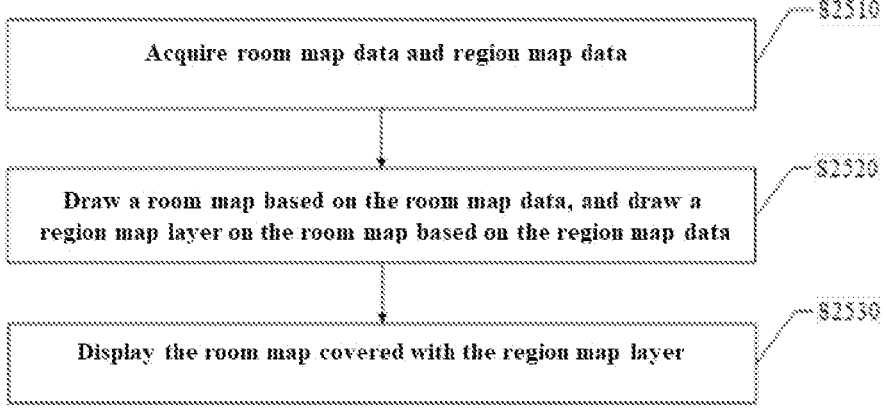
FIG. 25 shows a flowchart of a map display method according to an embodiment of the present disclosure.

Based on this, an exemplary embodiment of the present disclosure provides a map display method. Referring to FIG. 25, the map display method may include: step S2510:

acquiring room map data and region map data; step S2520: drawing a room map based on the room map data, and drawing a region map layer on the room map based on the region map data; and step S2530: displaying the room map covered with the region nap layer.

The map display method according to the exemplary embodiment of the present disclosure is used for a user equipment that interacts with an automatic cleaning apparatus. After the user equipment acquires the room map data and the region map data sent by the automatic cleaning apparatus, the region map layer may be drawn, based on the region map data, on the room map generated from the room map data, so that the room map covered with the region map layer may be obtained, and the room map may be displayed through the user equipment. That is to say, while the room map is displayed on the user equipment, the region map layer is also displayed on the room map, thereby helping a user to more accurately position and control a region to be cleaned by the automatic cleaning apparatus.

For example, when the region map layer is a carpet layer, the user may control the automatic cleaning apparatus to clean the carpet based on the room map with the carpet layer displayed on the user equipment. In particular, if there are multiple carpets in the room, the user may even designate the automatic cleaning apparatus to clean only some of the carpets based on the map display method provided by the exemplary embodiment of the present disclosure, thereby improving the user's operability, improving the intelligent control of the automatic cleaning apparatus, and enhancing the user experience.

It should be noted that the automatic cleaning apparatus may send the room map data and the region map data to the user equipment after responding to a carpet operation instruction from the user or after acquiring the room map data and the region map data, which is not particularly limited in the exemplary embodiment of the present disclosure.

The room map data obtained by the automatic cleaning apparatus usually includes room boundary coordinate data, and the region map data obtained by the automatic cleaning apparatus usually includes region boundary coordinate data. Both the room boundary coordinate data and the region boundary coordinate data are obtained by the automatic cleaning apparatus based on their minimum identifying units during boundary scanning, the minimum identifying unit is usually a coordinate point, that is, either the room boundary coordinate data or the region boundary coordinate data is composed of coordinate points of the boundary.

In practical applications, the room boundary coordinate data may be obtained by the automatic cleaning apparatus during the process of cleaning along a wall, while the region boundary coordinate data may be obtained by the automatic cleaning apparatus during the process of scanning along a boundary of a region, for example, along an edge of a boundary of a carpet.

In the exemplary embodiment of the present disclosure, drawing the room map based on the room map data includes: first determining a shape of a room map layer based on the room boundary coordinate data, so that the determined shape of the room map layer matches a real shape of the room map, and thus the room map may be drawn on this room map layer.

Determining the shape of the room map layer based on the room boundary coordinate data may include: determining a shape of a boundary of a room based on the room boundary coordinate data, and then determining the shape of the room map layer based on the shape of the boundary of the room.

A common shape of the room map layer may be a square shape, etc., which is not limited in the exemplary embodiment of the present disclosure.

After the shape of the room map layer is determined, it is also necessary to determine the size of the room map layer. According to the actual situation, a room map layer having the same size as a region enclosed by the boundary of the room may be used, or a room map layer having a larger or smaller size than the region enclosed by the boundary of the room may be used, which is not specifically limited in the exemplary embodiment of the present disclosure.

It should be noted that when the room boundary coordinate data is drawn on the room map layer having the smaller size than the region enclosed by the boundary of the room, it is necessary to scale down the room boundary coordinate data as needed, so that the room boundary coordinate points corresponding to the room boundary coordinate data may be drawn on the room map layer. The specific reduced scale may be determined according to the actual situation, which is not limited here.

In the exemplary embodiment of the present disclosure, after the room map layer is obtained, the room boundary coordinate data may be drawn on the room map layer one by one, so that the room map may be obtained.

After the room map is drawn, it is necessary to draw the region map layer on the room map to cover the room map with the region map layer, so that the room map including the region map may be obtained. The room map is displayed on the user equipment, so that the user may control the automatic cleaning apparatus to clean a designated region according to his/her own needs, so as to meet the diverse needs of the user.

In the exemplary embodiment of the present disclosure, drawing the region map layer on the room map may specifically include: drawing the region map layer on the room map based on the region map data. Since the room map data and the region map data are in the same two-dimensional space, a positional relationship between the room map and the region map layer may be determined based on the room map data and the region map data. The positional relationship reflects relative positions between the room map and the region map layer.

Based on the positional relationship, that is, based on the relative positions between the room map and the region map layer, the region map layer may be drawn on the room map to obtain the room map covered with the region map layer.

Figure 26:
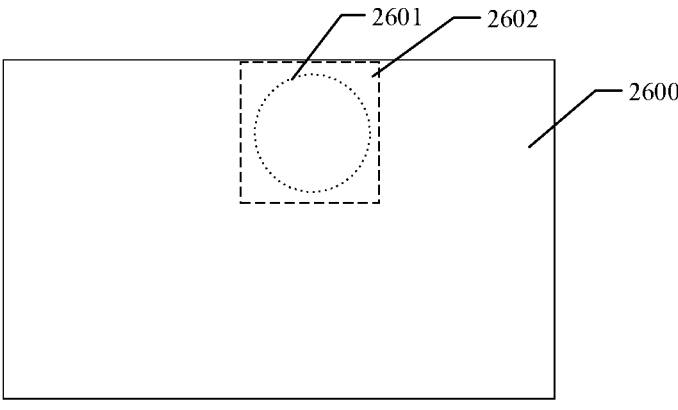
FIG. 26 shows a schematic structural diagram of drawing a region map layer on a room map according to an embodiment of the present disclosure.

In the exemplary embodiment of the present disclosure, drawing the region map layer on the room map based on the positional relationship may be drawing the region map layer directly at the corresponding position; or as shown in FIG. 26, marking out a sub-region 2602 corresponding to a region map layer 2601 on a room map 2600 and then drawing the region map layer 2601 on the sub-region 2602. By drawing the region map layer 2601 on the sub-region 2602, the calculation amount of data may be reduced, and the efficiency of drawing may be improved.

In addition, during the process of drawing the region map layer 2601 on the sub-region 2602, the sub-region 2602 may also be enlarged by a preset ratio, and units corresponding to the region map data may be drawn on the enlarged sub-region 2602 to obtain the region map layer 2601. The corresponding units may be point units or linear units, and these point units or linear units are drawn on the enlarged sub-region 2602 one by one to obtain the region map layer 2601.

However, if the distances among the drawn point units are relatively large, these point units may also be connected in sequence to obtain the region map layer 2601.

By drawing the region map layer 2601 on the enlarged sub-region 2602, the accuracy of positioning the point units or the linear units may be improved, so that the drawn region map layer 2601 is closer to the actual situation. The drawing process may also be displayed on the user equipment to enhance the user experience. Moreover, during the process of enlarging the sub-region 2602, there is no need to enlarge other regions, so that the calculation amount of data may be further reduced, and the efficiency of drawing may be further improved.

After the region map layer 2601 is obtained, the size of the enlarged sub-region 2602 may be restored, and the sub-region 2602 may be merged into the room map 2600, so that the room map 2600 may be covered with the region map layer 2601 to obtain the room map 2600 with the region map layer 2601 for display on the user equipment.

During the process of marking out the sub-region 2602, the area of the sub-region 2602 marked out needs to be larger than the area of the region map layer 2601, so that the region map layer 2601 is drawn in the sub-region 2602, thereby avoiding the omission of region map data.

In practical applications, a shape of the sub-region 2602 may be determined according to the actual situation. In the exemplary embodiment of the present disclosure, the shape of the sub-region 2602 is determined to be rectangular, for example, the sub-region 2602 may be composed of a rectangular array.

In the exemplary embodiment of the present disclosure, the room map may also be divided into multiple sub-regions, the sub-region where the region map layer is located is determined based on the positional relationship between the room map and the region map layer, and the above-mentioned step of drawing the region map layer is executed on this sub-region, which will not be repeated here.

In the exemplary embodiment of the present disclosure, the process of acquiring the room map data by the automatic cleaning apparatus may include: scanning a boundary of a room along a wall to acquire the room map data.

The process of acquiring the region map data by the automatic cleaning apparatus may include: scanning a boundary of a surface medium region such as a carpet region in a room to generate an initialized region.

Specifically, a surface medium region identifying device may be used to scan the boundary of the surface medium region, for example, a carpet identifying device 103 is used to scan a boundary of a carpet region. After scanning, an initialized region 2700 as shown in FIG. 27 may be generated based on the scanned boundary, and the initialized region 2700 may be recorded in the automatic cleaning apparatus.

Figures 27, 28:
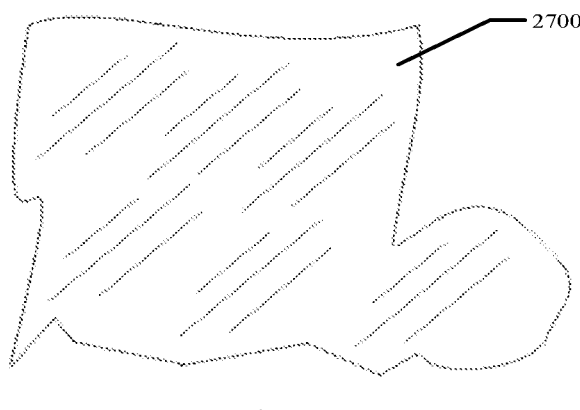
FIG. 27 shows a schematic structural diagram of an initialized region after a surface medium region is scanned according to an embodiment of the present disclosure.
FIG. 28 shows a schematic structural diagram of a merged region obtained based on the initialized region shown in FIG. 27.

Next, boundary coordinates of the initialized region 2700 may be merged, for example, adjacent boundary coordinates may be merged into one coordinate, and for example, an average coordinate of adjacent boundary coordinates may be taken as a boundary coordinate of the merged region, to obtain a merged region 2800 having a boundary smoother than a boundary of the initialized region 2700 as shown in FIG. 28. Meanwhile, boundary data corresponding to the merged region 2800 may be stored as the region map data in the automatic cleaning apparatus to as to be sent to the user equipment.

It should be noted that although the steps of the method of the present disclosure are described in a specific order in the drawings, this does not require or imply that these steps must be performed in this specific order, or that all of the steps shown must be performed in order to achieve the desired result. Additionally or alternatively, some steps may be omitted, multiple steps may be combined into one step for execution, and/or one step may be decomposed into multiple steps for execution, and the like.

Figure 29:
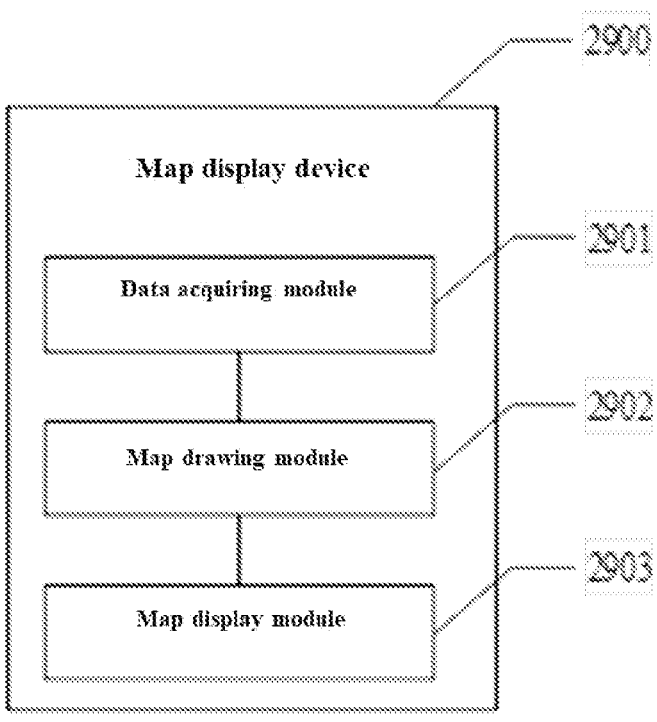
FIG. 29 shows a block diagram of a map display device according to an embodiment of the present disclosure.

In an exemplary embodiment of the present disclosure, there is further provided a map display device disposed in a user equipment. As shown in FIG. 29, the map display device 2900 may include: a data acquiring module 2901, a map drawing module 2902, and a map display module 2903.

The data acquiring module 2901 is configured to acquire room map data and region map data.

The map drawing module 2902 is configured to draw a room map based on the room map data, and to draw a region map layer on the room map based on the region map data.

The map display module 2903 is configured to display the room map covered with the region map layer.

The specific details of the above-mentioned modules of the map display device have been described in detail in the corresponding map display method, and thus will not be repeated here.

It should be noted that although several modules or units of the apparatus for execution are mentioned in the above detailed description, this division is not mandatory. Indeed, according to the embodiment of the present disclosure, the features and functions of two or more modules or units described above may be embodied in one module or unit. Conversely, the features and functions of one module or unit described above may be embodied in multiple modules or units.

In an exemplary embodiment of the present disclosure, there is further provided an electronic apparatus capable of implementing the above method.

It will be appreciated by those skilled in the art that, various aspects of the present disclosure may be implemented as a system, a method or a program product. Therefore, various aspects of the present disclosure may be embodied in the following forms: an entirely hardware embodiment, an entirely software embodiment (including firmware, microcode, etc.), or an embodiment combining hardware and software aspects, which may be collectively referred to herein as "a circuit", "a module" or "a system".

An electronic apparatus 3000 according to this embodiment of the present disclosure is described below with reference to FIG. 30. The electronic apparatus 3000 shown in FIG. 30 is only an example, and should not impose any limitation on the function and scope of use of the embodiment of the present disclosure.

Figure 30:
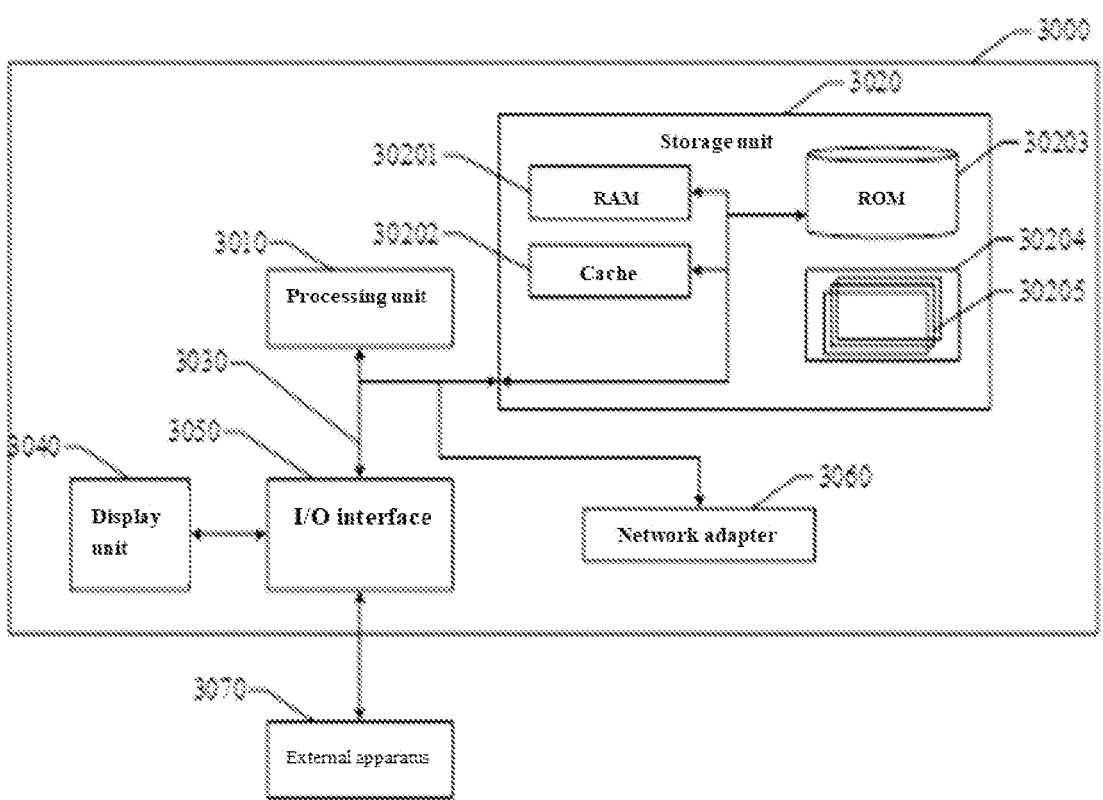
FIG. 30 shows a schematic diagram of modules of an electronic apparatus according to an embodiment of the present disclosure.

As shown in FIG. 30, the electronic apparatus 3000 takes the form of a general-purpose computing apparatus. Components of the electronic apparatus 3000 may include, but are not limited to: at least one processing unit 3010, at least one storage unit 3020, a bus 3030 connecting different system components (including the storage unit 3020 and the processing unit 3010), and a display unit 3040.

The storage unit 3020 stores a program code. The program code may be executed by the processing unit 3010 so that the processing unit 3010 executes the steps according to various exemplary embodiments of the present disclosure described in the above "Exemplary Method" section of this Description. For example, the processing unit 3010 may execute step S2010 of scanning a boundary of a surface medium region to generate an initialized region; step S2020 of merging boundary coordinates of the initialized region to obtain a merged region; and step S2030 of dividing the merged region into a plurality of sub-regions according to a preset shape, and drawing the boundary of the surface medium region based on the sub-regions and the merged region to obtain a map of the surface medium region, as shown in FIG. 19. For another example, the processing unit 3010 may execute step S2510 of acquiring room map data and region map data; step S2520 of drawing a room map based on the room map data, and drawing, based on the region map data, a region map layer on the room map; and step S2530 of displaying the room map covered with the region map layer, as shown in FIG. 25.

The storage unit 3020 may include a readable medium in the form of a volatile storage unit, such as a random-access storage unit (RAM) 30201 and/or a cache storage unit 30202, and may further include a read-only storage unit (ROM) 30203.

The storage unit 3020 may also include a program/utility 30204 having a set (at least one) of program modules 30205 including, but not limited to, an operating system, one or more applications, other program modules, and program data. Each of the operating system, one or more applications, other program modules, and program data or some combination thereof, may include an implementation of a networking environment.

The bus 3030 may represent one or more of several types of bus structures, including a memory unit bus or a memory unit controller, a peripheral bus, an accelerated graphics port, a processing unit or a local bus using any of a variety of bus structures.

The electronic apparatus 3000 may also communicate with one or more external apparatuses 3070 (e.g., a keyboard, a pointing apparatus, a Bluetooth apparatus, etc.), and may also communicate with one or more apparatuses that enable a user to interact with the electronic apparatus 3000, and/or may also communicate with any apparatus (e.g., a router, a modem, etc.) that enables the electronic apparatus 3000 to communicate with one or more other computing apparatuses. Such communication may occur via an input/output (I/O) interface 3050. Also, the electronic apparatus 3000 may also communicate with one or more networks (e.g., a local area network (LAN), a wide area network (WAN), and/or a public network such as the Internet) via a network adapter 3060. As shown in the figure, the network adapter 3060 communicates with other modules of the electronic apparatus 3000 via the bus 3030. It should be understood that, although not shown in the figure, other hardware and/or software modules may be used in conjunction with the electronic apparatus 3000, include but are not limited to: a microcode, an apparatus driver, a redundant processing unit, an external disk drive array, an RAID system, a tape drive and a data backup storage system, etc.

Those skilled in the art can easily understand from the description of the above embodiments that the exemplary embodiments described herein may be implemented by software, or by a combination of software and necessary hardware. Therefore, the technical solutions according to the embodiments of the present disclosure may be embodied in the form of software products, and the software products may be stored in a non-volatile storage medium (which may be a CD-ROM, a U disk, a mobile hard disk, etc.) or on the network, include several instructions to cause a computing apparatus (which may be a personal computer, a server, a terminal apparatus, or a network apparatus, etc.) to execute the method according to the embodiments of the present disclosure.

In an exemplary embodiment of the present disclosure, there is further provided a computer-readable storage medium having stored thereon a program product capable of implementing the above-described method of the present Description. In some possible embodiments, aspects of the present disclosure may also be implemented in the form of a program product including a program code which, when the program product runs on a terminal apparatus, causes the terminal apparatus to execute the steps according to various exemplary embodiments of the present disclosure described in the above "Exemplary Method" section of the present Description.

A program product for implementing the above method according to an embodiment of the present disclosure may be in form of a portable compact disc read-only memory (CD-ROM) and include a program code, and may run on a terminal apparatus such as a personal computer. However, the program product of the present disclosure is not limited thereto, and in this document, the readable storage medium may be any tangible medium which contains or stores a program, and the program may be used by or in combination with an instruction execution system, means, or a device.

The program product may be any combination of one or more readable medium. The readable medium may be a readable signal medium or a readable storage medium. The readable storage medium may be, for example, but not limited to, an electrical, magnetic, optical, electromagnetic, infrared, or semiconductor system, means or device, or any combination of the above. More specific examples (a non-exhaustive list) of the readable storage medium may include: an electrical connection with one or more wires, a portable disk, a hard disk, a random-access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination of the above.

The computer-readable signal medium may include a data signal propagated in a baseband or as part of a carrier wave, and readable program codes are carried in the data signal. This propagated data signal may be in many forms, including but not limited to an electromagnetic signal, an optical signal, or any suitable combination of the above. The readable signal medium may also be any readable medium other than the readable storage medium, and the readable medium may send, propagate, or transmit the program for use by or in combination with an instruction execution system, means, or device.

The program code contained on the readable medium may be transmitted by any suitable medium, including, but not limited to: wireless, wireline, optical cable, RF, etc., or any suitable combination of the above.

The program code for executing the operations of the present disclosure may be written in one programming language or any combination of a plurality of programming languages. The above programming languages include object-oriented programming languages, such as Java and C++, and also include conventional procedural programming languages, such as "C" language or similar programming languages. The program code may execute entirely on a user computing apparatus, partly on the user computing apparatus, as an independent software package, partly on the user computing apparatus and partly on a remote computing apparatus, or entirely on the remote computing apparatus or a server. In the case of the remote computing apparatus, the remote computing apparatus may be connected to the user computing apparatus through any type of network, including the local area network (LAN) or wide area network (WAN), or may be connected to an external computing apparatus (for example, via the Internet using an internet service provider (ISP)).

Furthermore, the above-mentioned drawings are merely provided for schematically illustrating the processes included in the method according to exemplary embodiments of the present disclosure, and are not intended to be limiting. It is readily understood that the processes shown in the above-mentioned drawings do not indicate or limit the chronological order of these processes. In addition, it is also readily understood that these processes may be performed synchronously or asynchronously, for example, in multiple modules.

Other embodiments of the present disclosure will be easily conceivable by those skilled in the art from consideration of the Description and practice of the present disclosure. This application is intended to cover any variations, uses, or adaptations of the present disclosure following the general principles of the present disclosure and including common knowledge or commonly used technical measures in the art which are not disclosed herein. The Description and embodiments are to be considered as exemplary only, with a true scope and spirit of the present disclosure being indicated by the claims.

It will be appreciated that the present disclosure is not limited to the exact construction that has been described above and illustrated in the accompanying drawings, and that various modifications and changes can be made without departing from the scope of the present disclosure. The scope of the present disclosure is only defined by the appended claims.

What is claimed is:

1. A map drawing method performed by a robotic cleaning device, comprising:

scanning a boundary of a surface medium region to generate an initialized region;

merging boundary coordinates of the initialized region to obtain a merged region;

forming a plurality of sub-regions from the merged region according to a preset shape;

generating the boundary of the surface medium region from the sub-regions and the merged region to obtain a map of the surface medium region; and controlling movement of the robotic cleaning device based on the generated map, wherein the initialized region comprises a plurality of initial boundary coordinates, and the merged region comprises a plurality of merged boundary coordinates; and wherein generating the boundary of the surface medium region from the sub-regions and the merged region comprises: deleting the merged boundary coordinates located outside the sub-regions and close to the sub-regions, and connecting the remaining merged boundary coordinates in sequence to generate the boundary of the surface medium region.

2. The map drawing method according to claim 1, wherein after the boundary of the surface medium region is generated, the method further comprises: filling a surface medium mark within the boundary of the surface medium region to obtain the map of the surface medium region.

3. The map drawing method according to claim 1, wherein merging the boundary coordinates of the initialized region to obtain the merged region comprises: merging adjacent boundary coordinates in the initialized region to obtain the merged region.

4. The map drawing method according to claim 1, wherein the method further comprises: after the map of the surface medium region is obtained, storing the map of the surface medium region in an automatic cleaning apparatus and sending the map of the surface medium region to a user terminal through the automatic cleaning apparatus.

5. The map drawing method according to claim 1, wherein the preset shape is one of a square shape, a circular shape, and a rhombic shape.

6. A non-transitory computer-readable storage medium having stored thereon a computer program, wherein the computer program, when executed by at least one hardware processor, implements a map drawing method performed by a robotic cleaning device, comprising:

scanning a boundary of a surface medium region to generate an initialized region;

merging boundary coordinates of the initialized region to obtain a merged region;

forming a plurality of sub-regions from the merged region according to a preset shape, and generating the boundary of the surface medium region from the sub-regions and the merged region to obtain a map of the surface medium region; and controlling movement of the robotic cleaning device based on the generated map, wherein the initialized region comprises a plurality of initial boundary coordinates, and the merged region comprises a plurality of merged boundary coordinates; and wherein generating the boundary of the surface medium region from the sub-regions and the merged region comprises: deleting the merged boundary coordinates located outside the sub-regions and close to the sub-regions, and connecting the remaining merged boundary coordinates in sequence to generate the boundary of the surface medium region.

7. The non-transitory computer-readable storage medium according to claim 6, wherein merging the boundary coordinates of the initialized region to obtain the merged region comprises: merging adjacent boundary coordinates in the initialized region to obtain the merged region.

8. The non-transitory computer-readable storage medium according to claim 6, wherein the method further comprises: after the map of the surface medium region is obtained, storing the map of the surface medium region in an automatic cleaning apparatus and sending the map of the surface medium region to a user terminal through the automatic cleaning apparatus.

9. The non-transitory computer-readable storage medium according to claim 6, wherein the preset shape is one of a square shape, a circular shape, and a rhombic shape.

10. An electronic apparatus, wherein the electronic apparatus is a robotic cleaning device or comprised in the robotic cleaning device, the electronic apparatus comprising:

at least one hardware processor; and a memory having processor-executable instructions stored thereon that, when executed, direct the at least one hardware processor to perform a map drawing method, comprising:

scanning a boundary of a surface medium region to generate an initialized region;

merging boundary coordinates of the initialized region to obtain a merged region;

forming a plurality of sub-regions from the merged region according to a preset shape, and generating the boundary of the surface medium region from the sub-regions and the merged region to obtain a map of the surface medium region; and controlling movement of the robotic cleaning device based on the generated map, wherein the initialized region comprises a plurality of initial boundary coordinates, and the merged region comprises a plurality of merged boundary coordinates; and wherein generating the boundary of the surface medium region from the sub-regions and the merged region comprises:

deleting the merged boundary coordinates located outside the sub-regions and close to the sub-regions, and connecting the remaining merged boundary coordinates in sequence to generate the boundary of the surface medium region.

11. The electronic apparatus according to claim 10, wherein after the boundary of the surface medium region is generated, the map drawing method further comprises: filling a surface medium mark within the boundary of the surface medium region to obtain the map of the surface medium region.

12. The electronic apparatus according to claim 10, wherein merging the boundary coordinates of the initialized region to obtain the merged region comprises: merging adjacent boundary coordinates in the initialized region to obtain the merged region.

13. The electronic apparatus according to claim 10, wherein the map drawing method further comprises: after the map of the surface medium region is obtained, storing the map of the surface medium region in an automatic cleaning apparatus and sending the map of the surface medium region to a user terminal through the automatic cleaning apparatus.

14. The electronic apparatus according to claim 10, wherein the preset shape is one of a square shape, a circular shape, and a rhombic shape.

\* \* \* \* \*